United States Patent
Sohma et al.

(10) Patent No.: US 9,297,950 B2
(45) Date of Patent: Mar. 29, 2016

(54) OPTICAL FIBER

(75) Inventors: Kazuyuki Sohma, Yokohama (JP);
Tomoyuki Hattori, Yokohama (JP);
Takashi Sueyoshi, Tokyo (JP); Seiichi Saito, Tokyo (JP); Koichi Sakamaki, Tokyo (JP)

(73) Assignees: SUMITOMO ELECTRIC INDUSTRIES, LTD., Osaka-shi, Osaka (JP); ADEKA CORPORATION, Tokyo (JP)

( * ) Notice: Subject to any disclaimer, the term of this patent is extended or adjusted under 35 U.S.C. 154(b) by 113 days.

(21) Appl. No.: 14/116,384

(22) PCT Filed: May 10, 2012

(86) PCT No.: PCT/JP2012/062067
§ 371 (c)(1),
(2), (4) Date: Feb. 7, 2014

(87) PCT Pub. No.: WO2012/153821
PCT Pub. Date: Nov. 15, 2012

(65) Prior Publication Data
US 2014/0199040 A1    Jul. 17, 2014

(30) Foreign Application Priority Data

May 10, 2011  (JP) ................. 2011-105251
Sep. 7, 2011  (JP) ................. 2011-194856

(51) Int. Cl.
*G02B 6/02* (2006.01)
*C03C 25/10* (2006.01)
*C03C 25/40* (2006.01)
*G02B 6/44* (2006.01)

(52) U.S. Cl.
CPC .......... *G02B 6/02395* (2013.01); *C03C 25/106* (2013.01); *C03C 25/40* (2013.01); *G02B 6/4436* (2013.01)

(58) Field of Classification Search
CPC .. C03C 25/106; C03C 25/40; G02B 6/02395; G02B 6/4436
USPC ........................................ 428/298.1; 385/128
See application file for complete search history.

(56) References Cited

U.S. PATENT DOCUMENTS 4,762,392 A * 8/1988 Yamamoto et al. ........... 385/128
2010/0179283 A1   7/2010 Sueyoshi et al.

FOREIGN PATENT DOCUMENTS

| JP | 2008-266485 | * | 6/2008 | ............. C08G 77/14 |
| JP | 2008-266485 A | | 11/2008 | |
| WO | WO-2008/133228 A1 | | 11/2008 | |
| WO | WO-2008/133229 A1 | | 11/2008 | |

OTHER PUBLICATIONS

Office Action dated Jun. 1, 2015 from Chinese patent application No. 2012800226596, with attached English-language translation.
Notification of Second Office Action issued on Dec. 15, 2015 in corresponding Chinese patent application, with attached English-language translation.

* cited by examiner

*Primary Examiner* — Ling Choi
*Assistant Examiner* — Chun-Cheng Wang
(74) *Attorney, Agent, or Firm* — Drinker Biddle & Reath LLP

(57) ABSTRACT

Provided is an optical fiber which is provided with heat resistance and productivity and in which a transmission loss is suppressed even in a high-temperature environment. It has, on an outer periphery of a glass fiber composed of a core part and a cladding part, a coating layer made by crosslinking an energy-curable resin composition containing a silicon compound, in which the silicon compound contained in the energy-curable resin composition of the coating layer as an outermost layer has a specified structure having a cyclic silicone site having an epoxy group and a linear silicone site, with the content of the cyclic silicone site in the compound being from 10 to 30% by mass.

5 Claims, 1 Drawing Sheet

OPTICAL FIBER

TECHNICAL FIELD

The present invention relates to an optical fiber having excellent heat resistance, which can be used in a temperature sensor system or the like in a high-temperature environment.

BACKGROUND ART

In recent years, sensing of temperature or the like by an optical signal has begun to be performed in a high-temperature environment.

In optical fibers used in such an environment, polyimide resins having high heat resistance have been being used as an optical fiber coating material.

In general, as a method for coating a glass fiber with a polyimide resin, there is known a method in which a varnish of a polyimide resin or a precursor thereof dissolved in a solvent such as NMP is used, this polyimide varnish is applied on the glass fiber surface, and the polyimide resin is then crosslinked for curing by heating in a crosslinking furnace. However, such a method involves such a problem that the solvent used in the varnish must be volatilized, so that the productivity is low (up to about 10 m/min).

In addition, a transmission loss of the optical fiber is significantly affected by physical properties or structure of the resin to be coated around the periphery of the glass fiber. Even if the coating resin is in an already stabilized state after curing, a physical minute residual stress or residual strain may be generated in the coating resin due to a stress or strain newly loaded on the optical fiber in a process of rewinding, etc. In the case where the distribution of this residual stress/strain is non-uniform in the optical fiber, an excessive transmission loss, called a microbending loss may be generated. Accordingly, the optical fiber is also similarly required to have a structure in which a microbending loss is suppressed.

Patent Document 1 discloses an energy (ultraviolet ray, etc.)-curable silicone resin (silicon compound) having a cyclosiloxane structure having an epoxy group introduced thereinto and a linear siloxane structure and describes that a cured product having excellent curing properties, heat resistance and flexibility is obtained by using this energy-curable silicone resin jointly with an epoxy-curable compound (curing agent).

RELATED ART DOCUMENTS

Patent Document

Patent Document 1: JP-A-2008-266485

SUMMARY OF THE INVENTION

Problem to be Solved by the Invention

In view of the foregoing problem of the prior art, the present invention has been made, and its object is to provide an optical fiber having heat resistance and productivity and further to provide an optical fiber having a suppressed transmission loss in a high-temperature environment in addition to foregoing properties.

Means for Solving the Problem

As a result of extensive and intensive investigations for the purpose of achieving the foregoing object, first, the present inventors have reached knowledge that by using, as a coating material, a silicon compound having a site (cyclic silicone site) composed of a cyclosiloxane structure having an epoxy group introduced thereinto and a linear silicone site as described in Patent Document 1 and further adjusting the content of the cyclic silicone site, an optical fiber provided with heat resistance and productivity is obtainable. Furthermore, they have reached knowledge that by forming a coating layer constituted of the above-described silicon compound into a double-layered structure and making the content (% by mass) of the cyclic silicone site of the silicon compound that constitutes an inner coating layer smaller than the content (% by mass) of the cyclic silicone site of the silicon compound that constitutes an outer coating layer, the optical fiber can be made such that a transmission loss is much more suppressed even in a high-temperature environment.

As a result of extensive and intensive investigations for the purpose of achieving the foregoing object, second, the present inventors have reached knowledge that by using, as a coating material, a resin composition containing an energy-curable silicone resin having a cyclosiloxane structure having an epoxy group introduced thereinto and a linear siloxane structure as described in Patent Document 1 and a cyclosiloxane compound having an epoxy group introduced thereinto, and adjusting the content of the cyclosiloxane compound having an epoxy group introduced thereinto, an optical fiber provided with heat resistance and productivity is obtainable. Furthermore, they have reached knowledge that by forming a coating layer constituted of the above-described silicon compound into a double-layered structure and making the content (% by mass) of the cyclosiloxane compound having an epoxy group introduced thereinto in the silicon compound that constitutes an inner coating layer smaller than the content (% by mass) of the cyclosiloxane compound having an epoxy group introduced thereinto in the silicon compound that constitutes an outer coating layer, the optical fiber can be made such that a transmission loss is much more suppressed even in a high-temperature environment.

The optical fiber of the present invention based on such knowledge is as follows.

[1] An optical fiber having, on an outer periphery of a glass fiber composed of a core part and a cladding part, a coating layer made by crosslinking an energy-curable resin composition containing a silicon compound, in which the silicon compound contained in the energy-curable resin composition of the coating layer as an outermost layer is a silicon compound represented by the following general formula (1), with the content of a cyclic silicone site in the following formula (1) being from 10 to 30% by mass.

[Chem. 1]

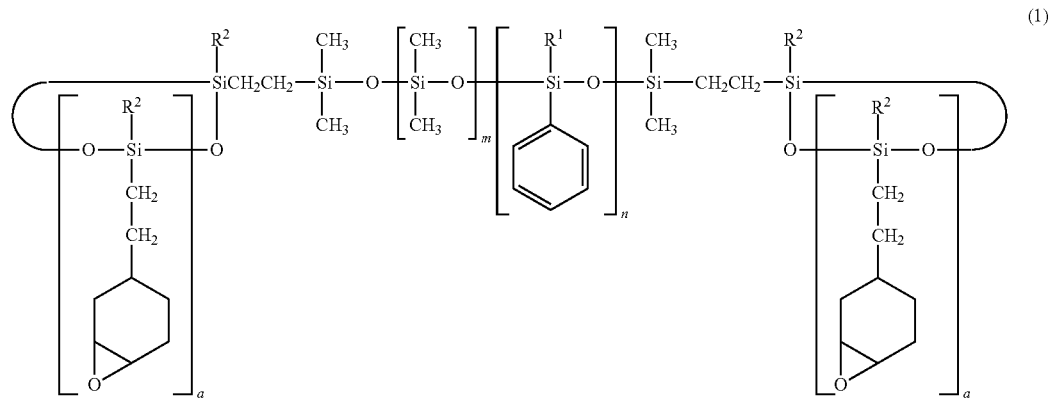

(1)

(In the formula, each of $R^1$ and $R^2$ independently represents a methyl group or a phenyl group; m represents the number of from 1 to 350; n represents the number of from 1 to 150; and a represents the number of from 2 to 5, provided that a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form.)

[2] The optical fiber as set forth in [1], which is an optical fiber having, on an outer periphery of a glass fiber composed of a core part and a cladding part, a coating layer made by crosslinking an energy-curable resin composition containing a silicon compound, in which the silicon compound contained in the energy-curable resin composition of the coating layer as an outermost layer is a silicon compound represented by the following general formula (1-1), with the content of a cyclic silicone site being from 10 to 30% by mass.

[Chem. 2]

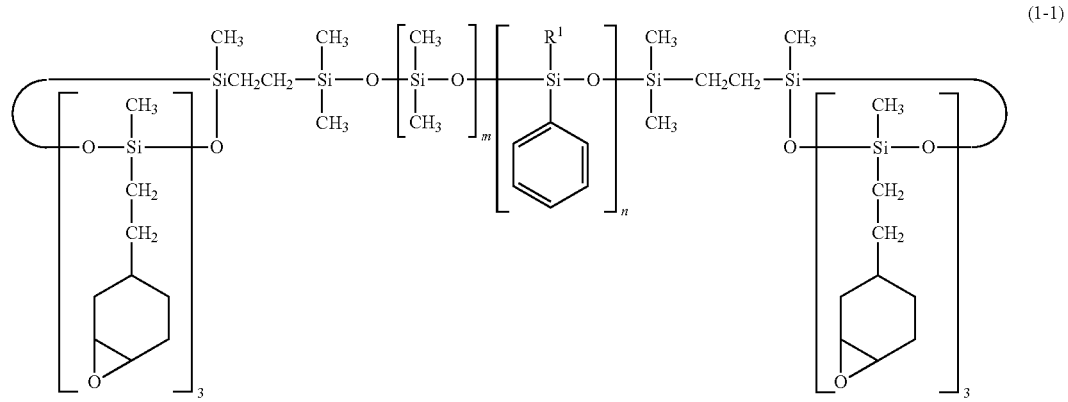

(1-1)

(In the formula, $R^1$ represents a methyl group or a phenyl group; m represents the number of from 1 to 350; and n represents the number of from 1 to 150, provided that a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form.)

[3] The optical fiber as set forth in [2], in which the coating layer is configured of two layers of an inner coating layer and an outer coating layer;

the energy-curable resin composition of the outer coating layer contains the silicon compound represented by the general formula (1-1), with the content (% by mass) of the cyclic silicone site being from 10 to 30% by mass;

the energy-curable resin composition of the inner coating layer contains the silicon compound represented by the general formula (1-1), with the content (% by mass) of the cyclic silicone site being from 5 to 20% by mass; and the content of the cyclic silicone site of the silicon compound contained in the inner coating layer is smaller than the content of the cyclic silicone site of the silicon compound contained in the outer coating layer.

[4] The optical fiber as set forth in [3], in which the content of the cyclic silicone site of the silicon compound contained in the energy-curable resin composition of the inner coating layer is smaller by at least 5% by mass than the content of the cyclic silicone site of the silicon compound contained in the energy-curable resin composition of the outer coating layer.

[5] The optical fiber as set forth in [1], which is an optical fiber having, on an outer periphery of a glass fiber composed of a core part and a cladding part, a coating layer made by crosslinking an energy-curable resin composition containing a silicon compound, in which the silicon compound contained in the energy-curable resin composition of the coating layer contains a compound (A) represented by the following general formula (2-1) and a compound (B) represented by the following general formula (2-2), with the content of the compound (B) being from 10 to 30 parts by mass based on 100 parts by mass of a total sum of the compound (A) and the compound (B).

[Chem. 3]

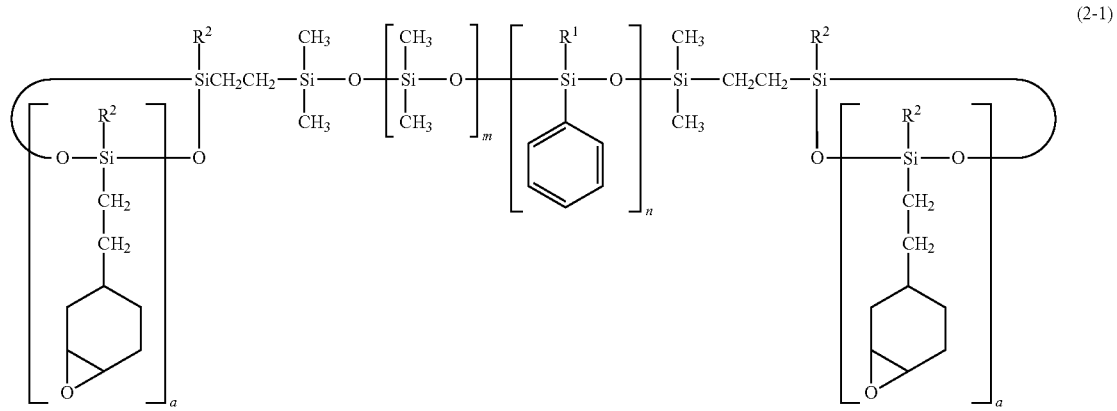

(2-1)

(In the formula, each of $R^1$ and $R^2$ independently represents a methyl group or a phenyl group; m represents the number of at least 10; n represents the number of at least 10; and a represents the number of from 2 to 5, provided that (m+n) is the number of from 20 to 10,000, a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form.)

[Chem. 4]

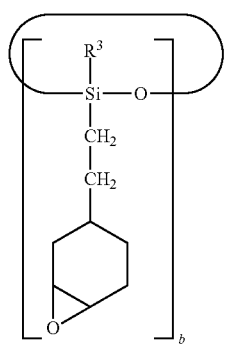

(2-2)

(In the formula, $R^3$ represents a methyl group or a phenyl group; and b represents the number of from 3 to 6.)

[6] The optical fiber as set forth in [5], in which
the coating layer is configured of two layers of an inner coating layer and an outer coating layer; and
the content of the compound (B) included in 100 parts by mass of a total sum of the compound (A) and the compound (B), contained in the energy-curable resin composition of the outer coating layer, is larger than the content of the compound (B) included in 100 parts by mass of a total sum of the compound (A) and the compound (B), contained in the energy-curable resin composition of the inner coating layer.

[7] The optical fiber as set forth in [6], in which
the coating layer is configured of two layers of the inner coating layer and the outer coating layer; and
the content of the compound (B) included in 100 parts by mass of a total sum of the compound (A) and the compound (B), contained in the energy-curable resin composition of the outer coating layer, is larger by at least 5 parts by mass than the content of the compound (B) included in 100 parts by mass of a total sum of the compound (A) and the compound (B), contained in the energy-curable resin composition of the inner coating layer.

Effect of the Invention

According to the present invention, it is possible to provide an optical fiber which is provided with heat resistance and productivity and in which a transmission loss is suppressed even in a high-temperature environment.

MODES FOR CARRYING OUT THE INVENTION

The optical fiber of the present invention is hereunder described in detail by reference to the accompanying drawings.

Figure 1:
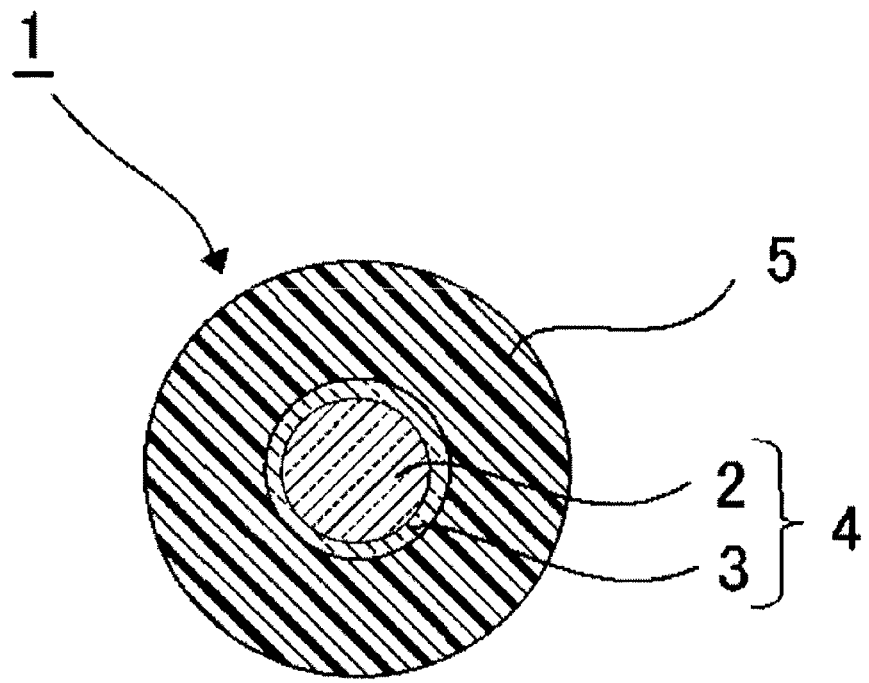
FIG. 1 This is a diagrammatic cross-sectional view illustrating an embodiment of an optical fiber of the present invention.

FIG. 1 is a diagrammatic cross-sectional view illustrating an example of an optical fiber of the present invention.

As illustrated in FIG. 1, an optical fiber 1 is a mode in which a single-layered coating layer 5 is formed on the outer periphery of a silica-based glass fiber 4 containing a core part 2 and a cladding part 3.

An outer diameter of the core part 2 can be made to, for example, from 6 μm to 70 μm, and an outer diameter of the cladding part 3 can be made to, for example, 125 μm. In addition, an outer diameter of the coating layer 5 can be made to, for example, from 150 μm to 300 μm.

A first embodiment of the present invention (hereinafter also referred to as "first invention") is hereunder described.

The first embodiment of the present invention is an optical fiber containing a coating layer made by crosslinking an energy-curable resin composition containing a silicon compound, on the outer periphery of a glass fiber composed of a core part and a cladding part, in which the silicon compound contained in the energy-curable resin composition of the coating layer as an outermost layer is a silicon compound represented by the following general formula (1-1), with the content of a cyclic silicone site being from 10 to 30% by mass.

general formula (1-1), with the content of a cyclic silicone site being from 10 to 30% by mass. In the general formula (1-1), the cyclic silicone site refers to a site represented by the following formula (1-0). The silicon compound represented by the general formula (1-1) is characterized by containing a linear silicone site and a cyclic silicone site in the molecule thereof.

[Chem. 6]

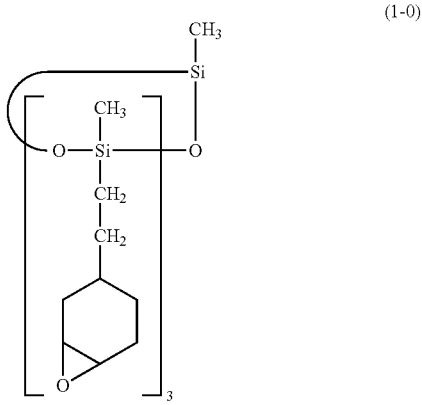

(1-0)

[Chem. 5]

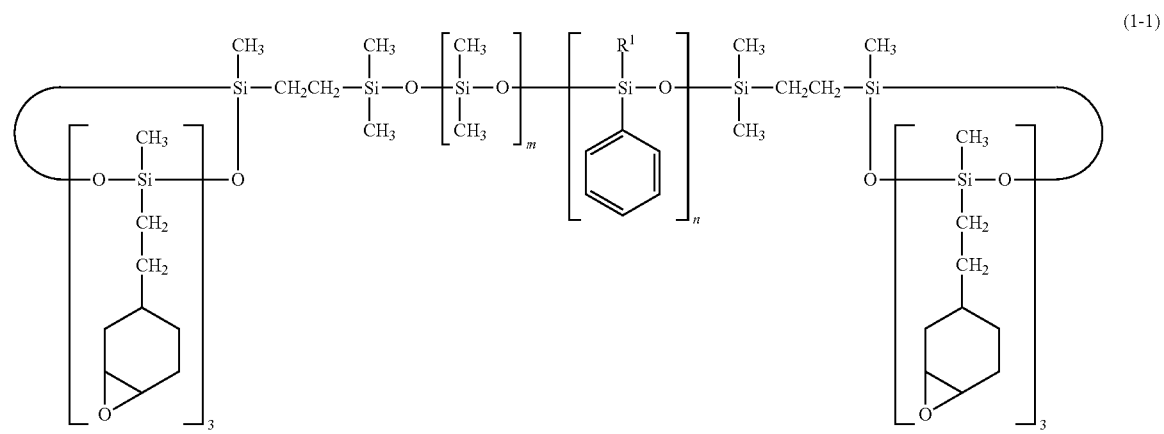

(1-1)

(In the formula, $R^1$ represents a methyl group or a phenyl group; m represents the number of from 1 to 350; and n represents the number of from 1 to 150, provided that a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form.)

In the first invention, the coating layer 5 is a coating layer made by crosslinking an energy-curable resin composition containing a silicon compound represented by the foregoing The silicon compound represented by the foregoing general formula (1-1) exhibits excellent heat resistance because it contains the cyclic silicone site. In addition, when the silicon compound represented by the general formula (1-1) is crosslinked upon irradiation with an ultraviolet ray or by heating, the resulting crosslinked structure reveals tensile strength due to the cyclic silicone site and reveals elongation due to the linear silicone site. Then, by adjusting the content of the cyclic silicone site in the silicon compound represented by the general formula (1-1), it becomes possible to control toughness and flexibility required for a coating material of optical fiber while keeping the heat resistance.

Since the coating layer 5 is prepared from the silicon compound represented by the foregoing general formula (1-1), with the content of the cyclic silicone site being from 10 to 30% by mass, it becomes possible to not only reveal flexibility and toughness suitable as a coating material of optical fiber with good balance but also remarkably enhance heat resistance and productivity of optical fiber. When used for the coating layer 5, in the case where the content of the cyclic silicone site of the silicon compound represented by the general formula (1-1) is less than 10% by mass, the coated surface may exhibit tackiness and therefore stick to a roll at the time of drawing to increase fiber break, or, on the occasion optical cabling, the introduction into an SUS pipe may become difficult. On the other hand, in the case where it exceeds 30% by mass, since the amount of organic components becomes excessively large, in a high-temperature environment, not only embrittlement is caused due to deterioration but also the resin shrinks to generate a crack, so that the tensile strength of optical fiber is lowered.

Figure 2:
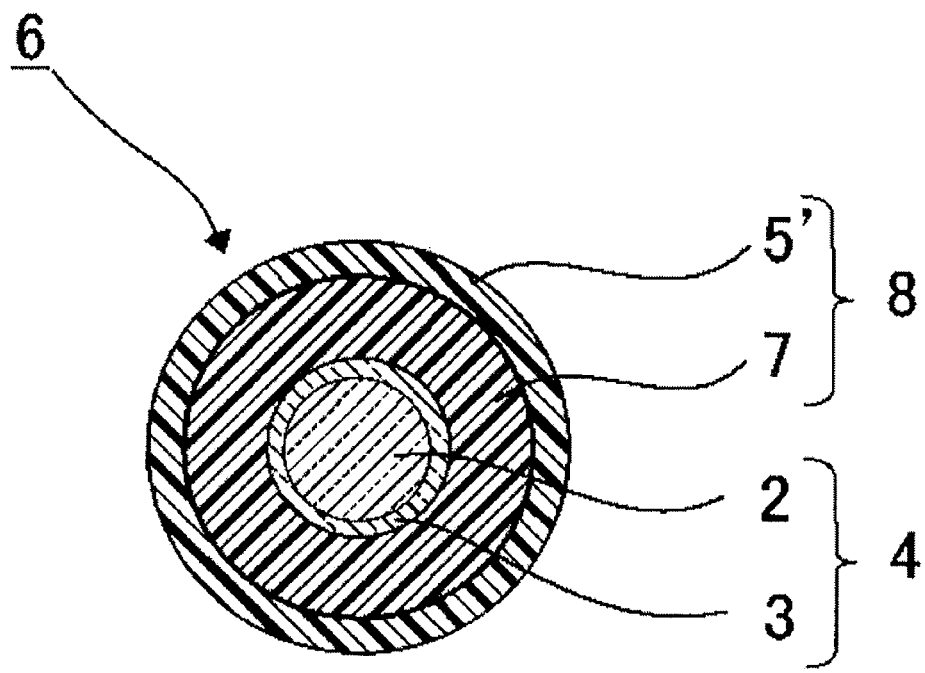
FIG. 2 This is a diagrammatic cross-sectional view illustrating another embodiment of an optical fiber of the present invention.

The optical fiber of the present invention may be one in which the coating layer is configured of plural layers as in an optical fiber 6 illustrated in FIG. 2. The optical fiber 6 illustrated in FIG. 2 is a mode in which a coating layer 8 of a double-layered configuration is formed on the outer periphery of the silica-based glass fiber 4 containing the core part 2 and the cladding part 3.

The coating layer 8 has a configuration in which an inner coating layer 7 and an outer coating layer 5' (outermost layer) are contained in this order from the side of the silica-based glass fiber 4 on the outer periphery of the silica-based glass fiber 4. The inner coating layer 7 is a layer made by crosslinking for curing an energy-curable resin composition, and the outer coating layer 5' is a layer made by crosslinking for curing an energy-curable resin composition containing the silicon compound represented by the general formula (1-1), with the content of the cyclic silicone site being from 10 to 30% by mass.

An outer diameter of the outer coating layer 5' can be made to, for example, from 180 μm to 300 μm, and an outer diameter of the inner coating layer 7 can be made to, for example, from 150 μm to 250 μm.

From the viewpoints of heat resistance and productivity, the inner coating layer 7 is desirably a layer made by crosslinking an energy-curable resin composition containing an energy-curable silicone resin, and preferably a layer made by crosslinking an energy-curable resin composition containing the silicon compound represented by the general formula (1-1). At that time, the content of the cyclic silicone site contained in the silicon compound represented by the general formula (1-1) that constitutes the energy-curable resin composition of the inner coating layer 7 is preferably adjusted to be smaller than the content of the cyclic silicone site contained in the silicon compound that constitutes the silicone compound represented by the general formula (1-1) that constitutes the energy-curable resin composition of the outer coating layer 5, and it is preferably smaller by at least 5% by mass, and more preferably smaller by at least 10% by mass. According to this, the toughness of the inner coating layer 7 is lower than that of the outer coating layer, and therefore, it becomes possible to defend an impact from the outside by the outer coating layer 5' and also to buffer an external force by the inner coating layer 7. As a result, the propagation of an external force into the glass fiber 4 can be prevented, and a microbending loss is much more suppressed even in a high-temperature environment.

In the case where the content of the cyclic silicone site of the silicon compound represented by the general formula (1-1) that constitutes the energy-curable resin composition of the inner coating layer 7 is large, a difference in the content of the cyclic silicone site from the energy-curable resin composition of the outer coating layer cannot be made large, whereas in the case where it is too small, curing properties as the coating layer are adversely affected (not sufficiently cured). Thus, the content of the cyclic silicone site is preferably from 5 to 20% by mass, and more preferably from 10 to 20% by mass.

In view of a balance between viscosity and curing properties, a mass average molecular weight of the silicon compound represented by the general formula (1-1) used in the optical fiber of the present invention is preferably from 3,000 to 20,000, more preferably from 4,000 to 15,000, and especially preferably from 5,000 to 10,000. Incidentally, the mass average molecular weight as referred to in the present invention means a mass average molecular weight in terms of polystyrene in the case of performing GPC analysis using tetrahydrofuran as a solvent.

A method for producing the silicon compound represented by the general formula (1-1) is not particularly limited, and it can be produced by applying a well-known reaction.

The silicon compound represented by the general formula (1-1) may be, for example, obtained by allowing a linear polysiloxane compound (1-a1) having an unsaturated bond as a precursor to react with 2,4,6,8-tetramethylcyclotetrasiloxane (also referred to as "1,3,5,7-tetramethylcyclotetrasiloxane") that is a cyclic polysiloxane compound, to obtain a polysiloxane intermediate (1-a2), and introducing an epoxy group thereinto by allowing it to react with 1,2-epoxy-4-vinylcyclohexane, or may be obtained by allowing 2,4,6,8-tetramethylcyclotetrasiloxane to react with 1,2-epoxy-4-vinylcyclohexane and then allowing the resulting epoxy group-containing cyclic polysiloxane compound (1-a3) to react with a linear polysiloxane compound (1-a1) having an unsaturated bond. Taking workability at manufacturing into consideration, the former method that goes through the polysiloxane intermediate (1-a2) is preferable.

[Chem. 7]

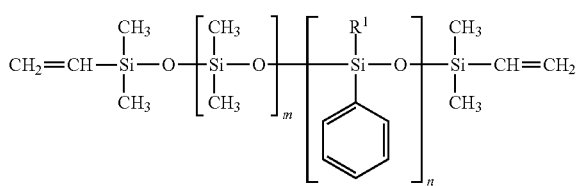

(1-1a)

(In the formula, $R^1$, m and n are synonymous with those in the general formula (1-1).)

[Chem. 8]

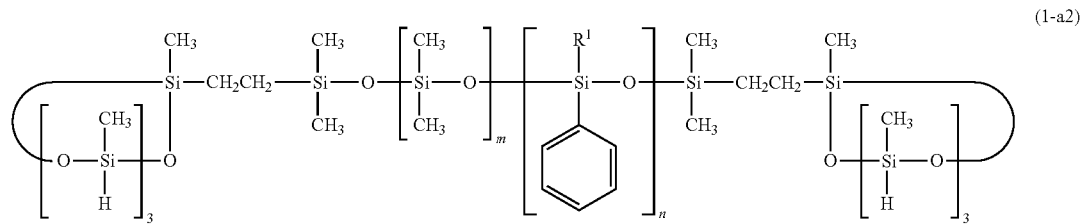

(1-a2)

(In the formula, $R^1$, m and n are synonymous with those in the general formula (1-1).)

[Chem. 9]

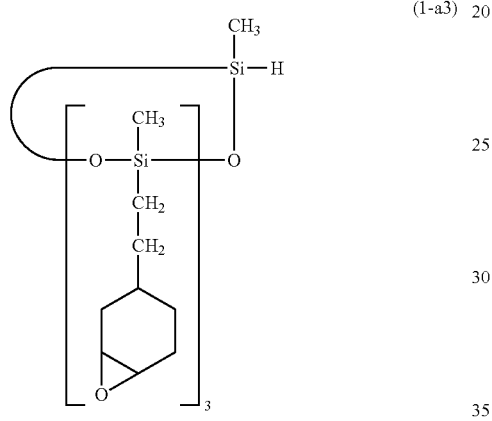

(1-a3)

The above-described linear polysiloxane compound (1-a1) having an unsaturated bond can be obtained by performing a condensation reaction of one kind or two or more kinds of bifunctional silane compounds by means of hydrolysis, followed by a reaction with a monofunctional silane compound having an unsaturated group. Representative examples of functional groups of these silane compounds include an alkoxy group, a halogen group and a hydroxyl group. The noncyclic polysiloxane compound (1-a1) having an unsaturated bond and 2,4,6,8-tetramethylcyclotetrasiloxane are bonded to each other by a reaction between unsaturated bond carbon of (1-a1) and an Si—H group of 2,4,6,8-tetramethylcyclotetrasiloxane.

Examples of the above-described bifunctional silane compound used for producing the above-described linear polysiloxane compound (1-a1) having an unsaturated bond include dialkoxymonosilane compounds such as dimethyldimethoxysilane, dimethyldiethoxysilane, diphenyldimethoxysilane, diphenyldiethoxysilane, methylphenyldimethoxysilane, and methylphenyldiethoxysilane; dichloromonosilane compounds such as dimethyldichlorosilane, diphenyldichlorosilane, and methylphenylchlorosilane; and the like.

Examples of the above-described monofunctional silane compound having an unsaturated group include dimethylvinylchlorosilane, dimethylvinylmethoxysilane, and dimethylvinylethoxysilane.

The condensation reaction by hydrolysis for obtaining the noncyclic polysiloxane compound (1-a1) having an unsaturated bond that is a precursor of the silicon compound may be performed by means of a so-called sol-gel reaction. The hydrolysis-condensation reaction of the bifunctional silane compound is advanced in such a manner that an alkoxy group or a halogen group is hydrolyzed with water to produce a silanol group (Si—OH group), and the produced silanol groups each other, the silanol group and the alkoxy group, or the silanol group and the halogen group, are condensed. In order to rapidly advance this hydrolysis reaction, it is preferable to add an appropriate amount of water, or a catalyst may be added. In addition, the condensation reaction is also advanced due to moisture in air or a minute amount of water contained in a solvent other than water. For this reaction, a solvent may be used. Though the solvent is not particularly limited, specific examples thereof include water and hydrophilic organic solvents such as methanol, ethanol, n-propanol, isopropanol, n-butanol, isobutanol, acetone, methyl ethyl ketone, dioxane, and tetrahydrofuran. They can be used solely or in admixture of two or more kinds thereof.

In addition, as the above-described catalyst, an acid or a base can be used. Specific examples thereof include inorganic acids such as hydrochloric acid, phosphoric acid, and sulfuric acid; organic acids such as acetic acid, p-toluenesulfonic acid, and monoisopropyl phosphate; inorganic bases such as sodium hydroxide, potassium hydroxide, lithium hydroxide, and ammonia; amine compounds (organic bases) such as trimethylamine, triethylamine, monoethanolamine, and diethanolamine; titanium compounds such as tetraisopropyl titanate and tetrabutyl titanate; tin compounds such as dibutyltin laurate and octyltin acid; boron compounds such as trifluoroborane; aluminum compounds such as aluminum trisacetyl acetate; chlorides of metals such as iron, cobalt, manganese, or zinc, and metal carboxylic acid salts such as naphthenic acid salts and octylic acid salts of these metals; and the like. They can be used solely or in combination of two or more kinds thereof. In addition, in the case of performing the hydrolysis-condensation reaction from two or more kinds of bifunctional silane compounds, the respective ones may be solely hydrolyzed to some extent and then mixed, followed by further performing the hydrolysis-condensation reaction, or all of ones may be mixed and then subjected to the hydrolysis-condensation reaction at once.

Though the temperature of the condensation reaction by the above-described hydrolysis varies depending upon the kind of the solvent, the kind and amount of the catalyst, and the like, it is preferably from 30 to 100° C., more preferably from 40 to 80° C., and most preferably from 50 to 75° C. In addition, under a basic condition, besides the condensation reaction, a hydrolysis reaction of the polysiloxane compound that is a reverse reaction occurs. The hydrolysis reaction preferentially occurs at a temperature of higher than 100° C. in particular, and by utilizing the hydrolysis reaction of the polysiloxane compound, it is possible to control the repeating unit number of the linear silicone site.

As described above, the noncyclic polysiloxane compound (1-a1) having an unsaturated bond that is a precursor can be obtained by, after performing the above-described hydrolysis-condensation reaction, allowing the resultant to react with a monofunctional silane compound having an unsaturated group.

For the reaction between the linear polysiloxane compound (1-a1) having an unsaturated bond that is a precursor and 2,4,6,8-tetramethylcyclotetrasiloxane, a method by means of a hydrosilylation reaction may be adopted. For example, the polysiloxane intermediate (1-a2) can be obtained by mixing the noncyclic polysiloxane compound (1-a1) and 2,4,6,8-tetramethylcyclotetrasiloxane and adding thereto an arbitrary amount of a hydroxysilylation reaction catalyst, followed by heating. In addition, the hydroxysilylation reaction may be similarly adopted for the reaction between 1,2-epoxy-4-vinylcyclohexane and the Si—H group of the polysiloxane intermediate (1-a2).

Examples of the above-described hydroxysilylation reaction catalyst include known catalysts containing one or more metals selected from the group consisting of platinum, palladium, and rhodium. Examples of the platinum-based catalyst include platinum-based catalysts such as a platinum-carbonylvinylmethyl complex, a platinum-divinyltetramethyldisiloxane complex, a platinum-cyclovinylmethylsiloxane complex, and a platinum-octylaldehyde complex. Examples of the palladium-based catalyst and the rhodium-based catalyst include compounds in which palladium or rhodium that is similarly a platinum-group metal is contained in place of the platinum in the above-described platinum-based catalysts. They may be used solely, or may be used in combination of two or more kinds thereof. In particular, from the standpoint of curing properties, those containing platinum are preferable. Specifically, a platinum-carbonylvinylmethyl complex is preferable. In addition, a so-called Wilkinson's catalyst containing the above-described platinum-group metal, such as chlorotristriphenylphosphine rhodium (I), is also included in the above-described hydroxysilylation reaction catalyst. The use amount thereof is preferably not more than 5% by mass, and more preferably from 0.0001 to 1.0% by mass of the whole amount of the reactants.

The content (% by mass) of the cyclic silicone site in the silicon compound represented by the general formula (1-1) can be controlled to a desired range by adjusting the repeating unit number of the linear silicone site by the above-describe method.

Next, the energy-curable resin composition in the first embodiment of the present invention is described.

Though the energy-curable resin composition used in the coating layer of the optical fiber of the present invention essentially contains the silicon compound represented by the general formula (1-1), it may also contain other epoxy-curable compound than the above-described silicon compound as an epoxy group-containing component. In that case, the content of the epoxy-curable compound is preferably from 0.01 to 20 parts by mass based on 100 parts by mass of a total mass of both of the silicon compound represented by the foregoing general formula (1-1) and the epoxy-curable compound. In the case where it is less than 0.01 parts by mass, there is a concern that a curing effect to be brought due to the epoxy-curable compound does not reveal, whereas in the case of use thereof in an amount of more than 20 parts by mass, there is a concern that the heat resistance of the resulting cured product is affected.

In the present invention, in order to conspicuously enjoy a balance between elongation and toughness revealed from the cyclic silicone site and the linear silicone site of the silicon compound represented by the general formula (1-1), it is preferable that other epoxy compound is not contained.

Though the above-described epoxy-curable compound may be a well-known general epoxy curing agent, those that cure the epoxy resin by the action of heat, an energy ray, or the like are suitably used. As the epoxy-curable compound, use can be made of phenol-based curing agents, amine-based curing agents, amide-based curing agents, imide-based curing agents, imidazole complex-based curing agents, acid anhydride-based curing agents, organic onium salt-based curing agents, metallocene-based curing agent, iron arene-based curing agents, and the like. Commercially available epoxy curing agents and cation polymerization initiators can also be used.

Of these, amine-based curing agents and organic onium salt-based curing agents are preferable because of good compatibility with the above-described silicon compound.

Examples of the above-described amine-based curing agent include diethylenetriamine, triethylenetetramine, tetraethylenepentamine, diethylaminopropylamine, N-aminoethylpiperazine, m-phenylenediamine, poly(oxypropylene)diamine, p,p'-diaminodiphenylmethane, p,p'-diaminodiphenyl sulfone, p,p'-diaminodiphenyl ether, aniline.$BF_3$, p-toluidine.$BF_3$, o-toluidine.$BF_3$, dimethylaniline.$BF_3$, N-methylaniline.$BF_3$, N-ethylaniline.$BF_3$, N,N'-dimethylaniline.$BF_3$, N,N'-diethylaniline.$BF_3$, ethylamine.$BF_3$, n-butylamine.$BF_3$, piperidine.$BF_3$, diphenylamine.$BF_3$, o-dimethylaminomethylphenol, 2,4,6-tris(dimethylaminomethyl)phenol, a triethanolamine boric acid salt, and the like.

Examples of the above-described organic onium salt-based curing agent include diazonium salts, iodonium salts, sulfonium salts, and the like. They may be one that gives curing due to cation polymerization by heat, or may be one that gives curing due to irradiation with an energy ray such as light, etc. In general, an aliphatic onium salt is used for the former, and an aromatic onium salt is used for the latter. The organic onium salt-based curing agent is useful chiefly when curing due to irradiation with an energy ray is performed because good curing can be obtained in a small use amount. As for one used in the present invention, an aromatic iodonium salt and an aromatic sulfonium salt are preferable because of good compatibility with the silicon compound.

Examples of the above-described aromatic iodonium salt include 4-isopropoxy-4'-methyldiphenyliodonium tetrakispentafluorophenyl borate, 4-isopropoxy-4'-methyldiphenyliodonium hexafluorophosphate, 4-isopropoxy-4'-methyldiphenyliodonium hexafluoroantimonate, (tolylcumyl)iodonium hexafluorophosphate, (tolylcumyl)iodonium hexafluoroantimonate, (tolylcumyl)iodonium tetrakispentafluorophenyl borate, bis(tertiary-butylphenyl)iodonium hexafluorophosphate, bis(tertiary-butylphenyl)iodonium hexafluoroantimonate, bis(tertiary-butylphenyl)iodonium tetrakispentafluorophenyl borate, and the like.

Examples of the above-described aromatic sulfonium salt include 4,4'-bis[di(4-heptoxyphenyl)sulfoniophenyl]sulfide bishexafluoroantimonate, 4,4'-bis[di(4-heptoxyphenyl)sulfoniophenyl]sulfide bishexafluorophosphate, 4-(4-benzoylphenylthio)phenyl-di-(4-fluorophenyl)sulfonium hexafluorophosphate, 4,4'-bis[bis((β-hydroxyethoxy)phenyl)sulfonio]phenylsulfide bishexafluorophosphate, 4,4'-bis[bis((β-hydroxyethoxy)phenyl)sulfonio]phenylsulfide bishexafluoroantimonate, 4,4'-bis[bis(fluorophenyl)sulfonio]phenylsulfide bishexafluorophosphate, 4,4'-bis[bis(fluorophenyl)sulfonio]phenylsulfide bishexafluoroantimonate, 4,4'-bis(diphenylsulfonio)phenylsulfide bishexafluorophosphate, 4,4'-bis(diphenylsulfonio)phenylsulfide bishexafluoroantimonate, 4-(4-benzoylphenylthio)phenyl-di-(4-(β-hydroxyethoxy)phenyl)sulfonium hexafluorophosphate, 4-(4-benzoylphenylthio)phenyl-di-(4-(βhydroxyethoxy)phenyl) sulfonium hexafluoroantimonate, 4-(4-benzoylphenylthio)phenyl-di-(4-fluorophenyl)sulfonium hexafluorophosphate, 4-(4-benzoylphenylthio)phenyl-di-(4-fluorophenyl)sulfonium hexafluoroantimonate, 4-(4-benzoylphenylthio)phenyl-diphenylsulfonium hexafluorophosphate, 4-(4-benzoylphenylthio)phenyl-diphenylsulfonium hexafluoroantimonate, 4-(phenylthio)phenyl-di-(4-(β-hydroxyethoxy)phenyl)sulfonium hexafluorophosphate, 4-(phenylthio)phenyl-di-(4-(β-hydroxyethoxy)phenyl)sulfonium hexafluoroantimonate, 4-(phenylthio)phenyl-di-(4-fluorophenyl)sulfonium hexafluorophosphate, 4-(phenylthio)phenyl-di-(4-fluorophenyl)sulfonium hexafluoroantimonate, 4-(phenylthio)phenyl-diphenylsulfonium hexafluorophosphate, 4-(phenylthio)phenyl-diphenylsulfonium hexafluoroantimonate, 4-(2-chloro-4-benzoylphenylthio)phenyl bis(4-fluorophenyl)sulfonium hexafluorophosphate, 4-(2-chloro-4-benzoylphenylthio)phenyl bis(4-fluorophenyl)sulfonium hexafluoroantimonate, 4-(2-chloro-4-benzoylphenylthio)phenyl diphenylsulfonium hexafluorophosphate, 4-(2-chloro-4-benzoylphenylthio)phenyldiphenylsulfonium hexafluoroantimonate, 4-(2-chloro-4-benzoylphenylthio)phenyl bis(4-hydroxyphenyl)sulfonium hexafluorophosphate, 4-(2-chloro-4-benzoylphenylthio)phenyl bis(4-hydroxyphenyl)sulfonium hexafluoroantimonate, triphenylsulfonium hexafluorophosphate, triphenylsulfonium hexafluoroantimonate, 4-acetoxyphenyldimethylsulfonium hexafluorophosphate, 4-acetoxyphenyldimethylsulfonium hexafluoroantimonate, 4-methoxycarbonyloxyphenyldimethylsulfonium hexafluorophosphate, 4-methoxycarbonyloxyphenyldimethylsulfonium hexafluoroantimonate, 4-ethoxycarbonyloxyphenyldimethylsulfonium hexafluorophosphate, 4-ethoxycarbonyloxyphenyldimethylsulfonium hexafluoroantimonate, and the like.

In addition, examples of the above-described amide-based curing agent include polyamide resins, diacetone acrylamide complexes, dicyandiamide, and the like. Examples of the above-described acid anhydride-based curing agent include phthalic anhydride, trimellitic anhydride, benzophenonetetracarboxylic anhydride, maleic anhydride, hexahydrophthalic anhydride, methylnadic anhydride, glutaric anhydride, pyromellitic anhydride, phenylene-bis(3-butane-1,2-dicarboxylic acid) anhydride, tetrabromophthalic anhydride, and the like.

The energy-curable resin composition of the present invention may be further blended with a weatherability-imparting agent as an arbitrary component. As the weatherability-imparting agent, use can be made of well-known materials which are generally used, such as a light stabilizer, an ultraviolet ray absorber, a phenol-based antioxidant, a sulfur-based antioxidant, and a phosphorus-based antioxidant. Examples of the light stabilizer include hindered amines; examples of the ultraviolet ray absorber include 2-hydroxybenzophenones, 2-(2-hydroxyphenyl)benzotriazoles, 2-(2-hydroxyphenyl)-4,6-diaryl-1,3,5-triazines, benzoates, and cyanoacrylates; examples of the phenol-based antioxidant include triethylene glycol-bis[3-(3-t-butyl-5-methyl-4-hydroxyphenyl)propionate], dibutyl hydroxytoluene (BHT), and 2,6-di-t-butyl-p-cresol (DBPC); examples of the sulfur-based antioxidant include dialkylthio dipropionates and β-alkylmercaptopropionic acid esters; and examples of the phosphorus-based antioxidant include organic phosphites.

In the case of using the above-described weatherability-imparting agent, its content is preferably from 0.0001 to 50% by mass, and more preferably from 0.001 to 10% by mass in the curable composition of the present invention from the standpoints of heat resistance, electric properties, curing properties, mechanical properties, storage stability, and handling properties.

The energy-curable resin composition in the present invention has good fluidity at room temperature (25° C.) and is excellent in handling properties. As for the fluidity, the viscosity measured at room temperature (25° C.) using an E-type viscometer in a state where a metal oxide fine powder is not contained is preferably not more than 50 Pa·s, and more preferably not more than 10 Pa·s.

In the energy-curable resin composition in the present invention, as for the type of curing, heat curing, light curing, or curing by both light and heat can be selected. The type of curing is preferably selected depending upon the kind of the above-described epoxy-curable compound which is arbitrarily added. In the case of heat curing, a curing temperature is preferably from 60 to 200° C., and more preferably from 80 to 150° C. A curing time is preferably from 0.1 to 10 hours, and more preferably from 1 to 6 hours. In the case of light curing, examples of a usable active energy ray include an ultraviolet ray, an electron beam, an X-ray, a radial ray, and a high frequency, with an ultraviolet ray being the most preferable from the standpoint of economy. Examples of a light source of the ultraviolet ray include an ultraviolet ray laser, a mercury vapor lamp, a high-pressure mercury vapor lamp, a xenon lamp, a sodium vapor lamp, and an alkali metal vapor lamp. The ultraviolet ray source as used herein is preferably a high-pressure mercury vapor lamp. As for the irradiation energy, though its optimum condition varies depending upon the thickness of the applied film, it is generally in the range of from 100 to 10,000 mJ/cm². In addition, in the case of performing heat curing after light curing, heating may be performed generally at a temperature ranging from 60 to 150° C.

Next, a second embodiment of the present invention (hereinafter also referred to as "second invention") is described.

The second embodiment of the present invention is an optical fiber containing a coating layer made by crosslinking an energy-curable resin composition containing a silicon compound, on the outer periphery of a glass fiber composed of a core part and a cladding part, in which the silicon compound contained in the energy-curable resin composition of the coating layer contains a compound (A) represented by the following general formula (2-1) and a compound (B) represented by the following general formula (2-2), with the content of the compound (B) being from 10 to 30 parts by mass based on 100 parts by mass of a total sum of the compound (A) and the compound (B).

[Chem. 10]

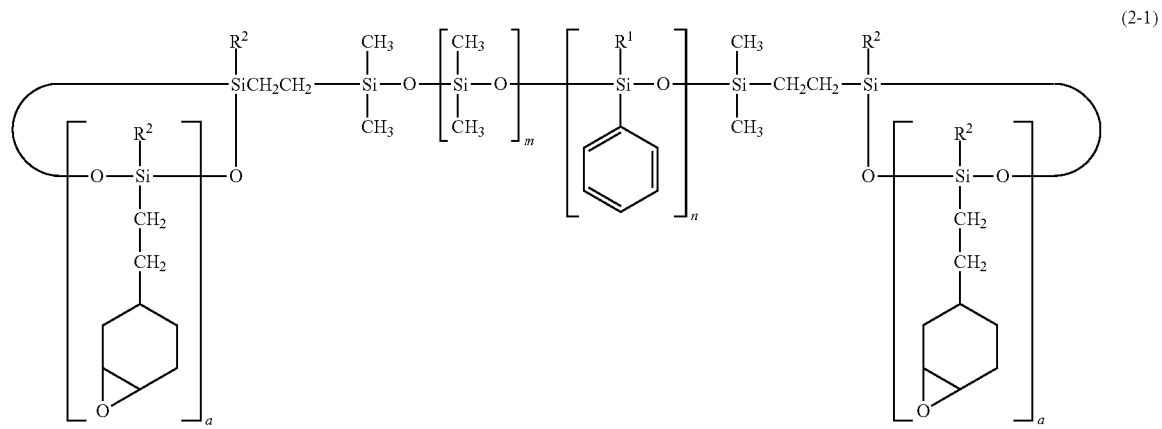

(2-1)

(In the formula, each of $R^1$ and $R^2$ independently represents a methyl group or a phenyl group; m represents the number of at least 10; n represents the number of at least 10; and a represents the number of from 2 to 5, provided that (m+n) is the number of from 20 to 10,000, a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form.)

[Chem. 11]

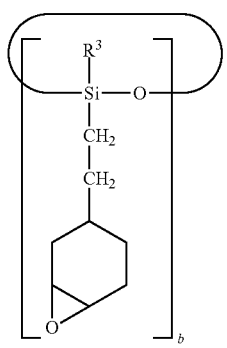

(2-2)

(In the formula, $R^3$ represents a methyl group or a phenyl group; and b represents the number of from 3 to 6.)

The energy-curable resin composition of the second embodiment of the present invention exhibits excellent heat resistance because it contains the compound (A) represented by the foregoing general formula (2-1) and the compound (B) represented by the foregoing general formula (2-2). Hereinafter, the compound represented by the foregoing general formula (2-1) is sometimes referred to as "compound (A)" and the compound represented by the foregoing general formula (2-2) is sometimes referred to as "compound (B)". When the energy-curable resin composition of the present invention is crosslinked upon irradiation with an ultraviolet ray or heating, the resulting crosslinked structure reveals elongation due to the linear silicone structure derived from the compound (A) and reveals tensile strength due to the cyclic silicone structure derived from the compound (A) and the compound (B). Then, by adjusting the content of the cyclic silicone structure by the blending amount of the compound (B), it becomes possible to control toughness and flexibility required for a coating material of optical fiber while keeping the heat resistance.

Since the coating layer 5 is prepared from the energy-curable resin composition of the present invention, it becomes possible to not only reveal flexibility and toughness suitable as a coating material of optical fiber with good balance but also remarkably enhance heat resistance and productivity of optical fiber. The energy-curable resin composition of the present invention contains the compound (A) and the compound (B), and when used for the coating layer 5, in the case where the content of the compound (B) is less than 10 parts by mass based on 100 parts by mass of a total sum of the compound (A) and the compound (B) in the energy-curable resin composition of the present invention, the coated surface may exhibit tackiness and therefore stick to a roll at the time of wire drawing to frequently cause breaking of wire, or, on the occasion of optical cabling, the introduction into an SUS pipe may become difficult. On the other hand, in the case where it exceeds 30 parts by mass, because of excessive crosslinking, flexibility is lowered, and in the case of being used in a high-temperature environment to cause deterioration, a crack is easily generated.

From the viewpoints of heat resistance and productivity, the energy-curable resin composition of the present invention is desirably an ultraviolet ray-curable resin composition.

The optical fiber of the present invention may be one in which the coating layer is configured of plural layers as in the optical fiber 6 illustrated in FIG. 2. In the case where the coating layer is configured of plural layers, when an outermost layer thereof is formed of the energy-curable resin composition of the present invention, conspicuous effects in heat resistance and productivity can be enjoyed.

The optical fiber 6 illustrated in FIG. 2 is a mode in which the coating layer 8 of a double-layered configuration is formed on the outer periphery of the silica-based glass fiber 4 containing the core part 2 and the cladding part 3.

The coating layer 8 contains, as the outer coating layer 5', a coating layer made by crosslinking for curing the energy-curable resin composition of the present invention and is further provided with the inner coating layer 7 made by crosslinking for curing an ultraviolet ray-curable resin composition or a heat-curable resin composition on the inner periphery side thereof.

An outer diameter of the outer coating layer 5' can be made to, for example, from 180 μm to 300 μm, and an outer diameter of the inner coating layer 7 can be made to, for example, from 150 μm to 250 μm.

From the viewpoints of heat resistance and productivity, the inner coating layer 7 is desirably a layer made by crosslinking an ultraviolet ray-curable resin composition containing an ultraviolet ray-curable silicone resin, and preferably a layer made by crosslinking an ultraviolet ray-curable resin composition containing the compound (A) and the compound (B). At that time, the content (parts by mass) of the compound (B) included in 100 parts by mass of a total sum of the compound (A) and the compound (B) in the ultraviolet ray-curable resin composition of the inner coating layer 7 is preferably adjusted to be smaller than the content (parts by mass) of the compound (B) included in 100 parts by mass of a total sum of the compound (A) and the compound (B) in the ultraviolet ray-curable resin composition of the outer coating layer 5', and it is most preferably smaller by 5% by mass or more and not more than 10% by mass. According to this, the toughness of the inner coating layer 7 is lower than that of the outer coating layer, and therefore, it becomes possible to defend an impact from the outside by the outer coating layer 5' and also to buffer an external force by the inner coating layer 7. As a result, the propagation of an external force into the glass fiber 4 can be prevented, and a microbending loss is much more suppressed even in a high-temperature environment.

In order to make the strength and heat resistance in appropriate ranges as the coating layer while exhibiting the above-described effect for buffering an external force by making a difference from the content of the compound (B) in the outer coating layer to some extent, the content of the compound (B) in the inner coating layer 7 is preferably from 5 to 20 parts by mass, and more preferably from 10 to 20 parts by mass per 100 parts by mass of a total sum of the compound (A) and the compound (B).

The compound (A) used in the optical fiber of the present invention is described.

In the general formula (2-1), each of $R^1$ and $R^2$ independently represents a methyl group or a phenyl group. $R^2$ is preferably a methyl group in view of easiness of availability of a raw material. m represents the number of at least 10, and n represents the number of at least 10. However, (m+n) is the number of from 20 to 10,000, a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form. (m+n) is preferably from 35 to 330, more preferably from 45 to 250, and most preferably from 50 to 200. a represents the number of from 2 to 5. In view of the facts that the raw material is easily available and that a cured product having excellent tensile strength is obtained, a is preferably the number of from 3 to 4, and more preferably the number of 3. In view of a balance between viscosity and curing properties, a mass average molecular weight of the compound (A) is preferably from 5,000 to 30,000, more preferably from 6,000 to 25,000, and especially preferably from 7,000 to 20,000. Incidentally, the mass average molecular weight as referred to in the present invention means a mass average molecular weight in terms of polystyrene in the case of performing GPC analysis using tetrahydrofuran as a solvent.

A method for producing the compound (A) is not particularly limited, and it can be produced by applying a well-known reaction.

The compound (A) may be, for example, obtained by allowing a linear polysiloxane compound (2-a1) having an unsaturated bond as a precursor to react with a cyclic polysiloxane compound (2-a2) to obtain a polysiloxane intermediate (2-a3), and introducing an epoxy group thereinto by allowing it to react with 1,2-epoxy-4-vinylcyclohexane, or may be obtained by allowing a cyclic polysiloxane compound (2-a2) to react with 1,2-epoxy-4-vinylcyclohexane and then allowing the resulting epoxy group-containing cyclic polysiloxane compound (2-a4) to react with a linear polysiloxane compound (2-a1) having an unsaturated bond. Taking workability at manufacturing into consideration, the former method that goes through the polysiloxane intermediate (2-a3) is preferable.

[Chem. 12]

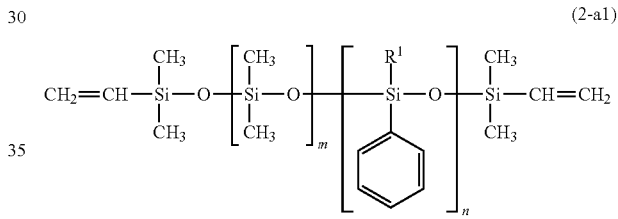

(2-a1)

(In the formula, $R^1$, m and n are synonymous with those in the general formula (2-1).)

[Chem. 13]

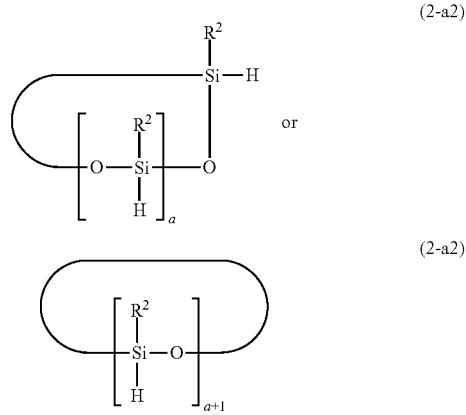

(2-a2)

or (2-a2)

(In the formula, $R^2$ and a are synonymous with those in the general formula (2-1).)

[Chem. 14]

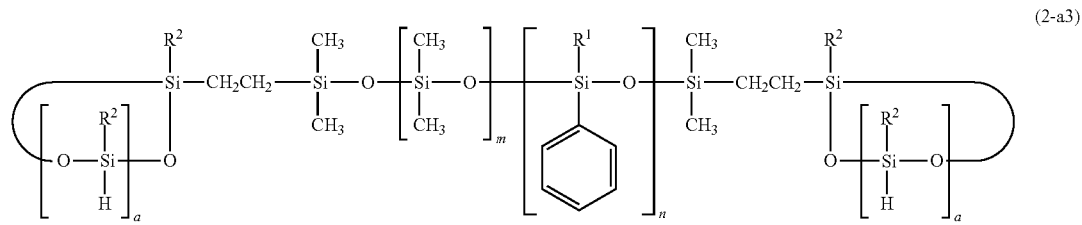

(2-a3)

(In the formula, $R^1$, $R^2$, a, m, and n are synonymous with those in the general formula (2-1).)

[Chem. 15]

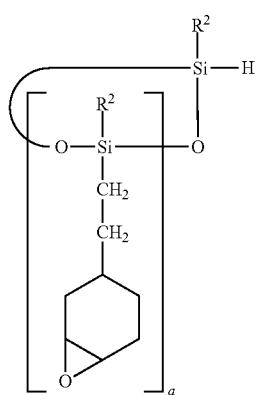

(2-a4)

(In the formula, $R^2$ and a are synonymous with those in the general formula (2-1).)

The above-described linear polysiloxane compound (2-a1) having an unsaturated bond can be obtained by performing a condensation reaction of one kind or two or more kinds of bifunctional silane compounds by means of hydrolysis, followed by a reaction with a monofunctional silane compound having an unsaturated group. Representative examples of functional groups of these silane compounds include an alkoxy group, a halogen group and a hydroxyl group. The noncyclic polysiloxane compound (2-a1) having an unsaturated bond and the cyclic polysiloxane compound (2-a2) are bonded to each other by a reaction between unsaturated bond carbon of (2-a1) and an Si—H group of the cyclic polysiloxane compound (2-a2).

Examples of the above-described bifunctional silane compound used for producing the above-described linear polysiloxane compound (2-a1) having an unsaturated bond include dialkoxymonosilane compounds such as dimethyldimethoxysilane, dimethyldiethoxysilane, diphenyldimethoxysilane, diphenyldiethoxysilane, methylphenyldimethoxysilane, and methylphenyldiethoxysilane; dichloromonosilane compounds such as dimethyldichlorosilane, diphenyldichlorosilane, and methylphenylchlorosilane; and the like.

Examples of the above-described monofunctional silane compound having an unsaturated group include dimethylvinylchlorosilane, dimethylvinylmethoxysilane, and dimethylvinylethoxysilane.

The condensation reaction by hydrolysis for obtaining the noncyclic polysiloxane compound (2-a1) having an unsaturated bond that is a precursor of the silicon compound may be performed by means of a so-called sol-gel reaction. The hydrolysis-condensation reaction of the bifunctional silane compound is advanced in such a manner that an alkoxy group or a halogen group is hydrolyzed with water to produce a silanol group (Si—OH group), and the produced silanol groups each other, the silanol group and the alkoxy group, or the silanol group and the halogen group, are condensed. In order to rapidly advance this hydrolysis reaction, it is preferable to add an appropriate amount of water, or a catalyst may be added. In addition, the condensation reaction is also advanced due to moisture in air or a minute amount of water contained in a solvent other than water. For this reaction, a solvent may be used. Though the solvent is not particularly limited, specific examples thereof include water and hydrophilic organic solvents such as methanol, ethanol, n-propanol, isopropanol, n-butanol, isobutanol, acetone, methyl ethyl ketone, dioxane, and tetrahydrofuran. They can be used solely or in admixture of two or more kinds thereof.

In addition, as the above-described catalyst, an acid or a base can be used. Specific examples thereof include inorganic acids such as hydrochloric acid, phosphoric acid, and sulfuric acid; organic acids such as acetic acid, p-toluenesulfonic acid, and monoisopropyl phosphate; inorganic bases such as sodium hydroxide, potassium hydroxide, lithium hydroxide, and ammonia; amine compounds (organic bases) such as trimethylamine, triethylamine, monoethanolamine, and diethanolamine; titanium compounds such as tetraisopropyl titanate and tetrabutyl titanate; tin compounds such as dibutyltin laurate and octyltin acid; boron compounds such as trifluoroborane; aluminum compounds such as aluminum trisacetyl acetate; chlorides of metals such as iron, cobalt, manganese, or zinc, and metal carboxylic acid salts such as naphthenic acid salts and octylic acid salts of these metals; and the like. They can be used solely or in combination of two or more kinds thereof. In addition, in the case of performing the hydrolysis-condensation reaction from two or more kinds of bifunctional silane compounds, the respective ones may be solely hydrolyzed to some extent and then mixed, followed by further performing the hydrolysis-condensation reaction, or all of ones may be mixed and then subjected to the hydrolysis-condensation reaction at once.

Though the temperature of the condensation reaction by the above-described hydrolysis varies depending upon the kind of the solvent, the kind and amount of the catalyst, and the like, it is preferably from 30 to 100° C., more preferably from 40 to 80° C., and most preferably from 50 to 75° C. In addition, under a basic condition, besides the condensation reaction, a hydrolysis reaction of the polysiloxane compound that is a reverse reaction occurs. The hydrolysis reaction preferentially occurs at a temperature of higher than 100° C. in particular, and by utilizing the hydrolysis reaction of the polysiloxane compound, it is possible to control the repeating unit number of the linear silicone site.

As described above, the noncyclic polysiloxane compound (2-a1) having an unsaturated bond that is a precursor can be obtained by, after performing the above-described hydrolysis-condensation reaction, allowing the resultant to react with a monofunctional silane compound having an unsaturated group.

For the reaction between the linear polysiloxane compound (2-a1) having an unsaturated bond that is a precursor and the cyclic polysiloxane compound (2-a2), a method by means of a hydrosilylation reaction may be adopted. For example, the polysiloxane intermediate (2-a3) can be obtained by mixing the noncyclic polysiloxane compound (2-a1) and the cyclic polysiloxane compound (2-a2) and adding thereto an arbitrary amount of a hydroxysilylation reaction catalyst, followed by heating. In addition, the hydroxysilylation reaction may be similarly adopted for the reaction between 1,2-epoxy-4-vinylcyclohexane and the Si—H group of the polysiloxane intermediate (2-a3).

Examples of the above-described hydroxysilylation reaction catalyst include known catalysts containing one or more metals selected from the group consisting of platinum, palladium, and rhodium. Examples of the platinum-based catalyst include platinum-based catalysts such as a platinum-carbonylvinylmethyl complex, a platinum-divinyltetramethyldisiloxane complex, a platinum-cyclovinylmethylsiloxane complex, and a platinum-octylaldehyde complex. Examples of the palladium-based catalyst and the rhodium-based catalyst include compounds in which palladium or rhodium that is similarly a platinum-group metal is contained in place of the platinum in the above-described platinum-based catalysts. They may be used solely, or may be used in combination of two or more kinds thereof. In particular, from the standpoint of curing properties, those containing platinum are preferable. Specifically, a platinum-carbonylvinylmethyl complex is preferable. In addition, a so-called Wilkinson's catalyst containing the above-described platinum-group metal, such as chlorotristriphenylphosphine rhodium (I), is also included in the above-described hydroxysilylation reaction catalyst. The use amount thereof is preferably not more than 5% by mass, and more preferably from 0.0001 to 1.0% by mass of the whole amount of the reactants.

Next, the compound (B) used in the optical fiber of the present invention is described.

In the foregoing general formula (2-2), $R^3$ represents a methyl group or a phenyl group; and b represents the number of from 3 to 6. In view of the facts that the raw material is easily available and that a cured product having excellent tensile strength is obtained, b is preferably the number of from 4 to 5, and more preferably the number of 4. The compound (B) can be obtained by allowing the following cyclic polysiloxane compound (2-a5) to react with 1,2-epoxy-4-vinylcyclohexane to introduce an epoxy group.

[Chem. 16]

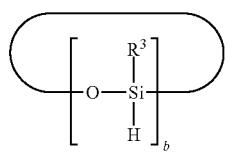

(2-a5)

The reaction between the above-described cyclic polysiloxane compound (2-a5) and 1,2-epoxy-4-vinylcyclohexane may be performed under the same condition (hydrosilylation reaction) as that in the above-described reaction between the linear polysiloxane compound (2-a1) having an unsaturated bond and the cyclic polysiloxane compound (2-a2).

Next, the energy-curable resin composition in the second embodiment of the present invention is described.

The energy-curable resin composition used in the outermost layer of the coating layer of the optical fiber of the present invention contains the compound (A), the compound (B), and an epoxy-curable compound. In the above-described energy-curable resin composition, the content of the epoxy-curable compound is preferably from 0.01 to 20 parts by mass based on 100 parts by mass of a total sum of the compound (A) and the compound (B). In the case where the content of the epoxy-curable compound is less than 0.01 parts by mass, there is a concern that sufficient curing cannot be achieved, whereas in the case of use thereof in an amount of more than 20 parts by mass, there is a concern that the heat resistance of the resulting cured product is affected.

The above-described energy-curable resin composition may also contain other epoxy compound than the compound (A) and the compound (B) as an epoxy group-containing component. In that case, the content of the epoxy-curable compound is preferably from 0.01 to 20 parts by mass based on 100 parts by mass of a total mass of the compound (A), the compound (B), and other epoxy compound. In the case where it is less than 0.01 parts by mass, there is a concern that sufficient curing cannot be achieved, whereas in the case of use thereof in an amount of more than 20 parts by mass, there is a concern that the heat resistance of the resulting cured product is affected. In the present invention, in order to conspicuously enjoy a balance between elongation and toughness revealed from the cyclic silicone site and the linear silicone site of the compound (A) and the compound (B), it is preferable that other epoxy compound is not contained.

Though the above-described epoxy-curable compound may be a well-known general epoxy curing agent, those that cure the epoxy resin by the action of heat, an energy ray, or the like are suitably used. As the epoxy-curable compound, use can be made of phenol-based curing agents, amine-based curing agents, amide-based curing agents, imide-based curing agents, imidazole complex-based curing agents, acid anhydride-based curing agents, organic onium salt-based curing agents, metallocene-based curing agent, iron arene-based curing agents, and the like. Commercially available epoxy curing agents and cation polymerization initiators can also be used.

Of these, amine-based curing agents and organic onium salt-based curing agents are preferable because of good compatibility with the above-described silicon compound.

Examples of the above-described amine-based curing agent include diethylenetriamine, triethylenetetramine, tetraethylenepentamine, diethylaminopropylamine, N-aminoethylpiperazine, m-phenylenediamine, poly(oxypropylene)diamine, p,p'-diaminodiphenylmethane, p,p'-diaminodiphenyl sulfone, p,p'-diaminodiphenyl ether, aniline.$BF_3$, p-toluidine.$BF_3$, o-toluidine.$BF_3$, dimethylaniline.$BF_3$, N-methylaniline.$BF_3$, N-ethylaniline.$BF_3$, N,N'-dimethylaniline.$BF_3$, N,N'-diethylaniline.$BF_3$, ethylamine.$BF_3$, n-butylamine.$BF_3$, piperidine.$BF_3$, diphenylamine.$BF_3$, o-dimethylaminomethylphenol, 2,4,6-tris(dimethylaminomethyl)phenol, a triethanolamine.boric acid salt, and the like.

Examples of the above-described organic onium salt-based curing agent include diazonium salts, iodonium salts, sulfonium salts, and the like. They may be one that gives curing due to cation polymerization by heat, or may be one that gives curing due to irradiation with an energy ray such as light, etc. In general, an aliphatic onium salt is used for the former, and an aromatic onium salt is used for the latter. The organic onium salt-based curing agent is useful chiefly when curing due to irradiation with an energy ray is performed because good curing can be obtained in a small use amount. As for one used in the present invention, an aromatic iodonium salt and an aromatic sulfonium salt are preferable because of good compatibility with the silicon compound.

Examples of the above-described aromatic iodonium salt include 4-isopropoxy-4'-methyldiphenyliodonium tetrakis (pentafluorophenyl borate), 4-isopropoxy-4'-methyldiphenyliodonium hexafluorophosphate, 4-isopropoxy-4'-methyl-diphenyliodonium hexafluoroantimonate, (tolylcumyl) iodonium hexafluorophosphate, (tolylcumyl)iodonium hexafluoroantimonate, (tolylcumyl)iodonium tetrakis(pentafluorophenyl borate), bis(tertiary-butylphenyl)iodonium hexafluorophosphate, bis(tertiary-butylphenyl)iodonium hexafluoroantimonate, bis(tertiary-butylphenyl)iodonium (tetrakispentafluorophenyl borate), and the like.

Examples of the above-described aromatic sulfonium salt include 4,4'-bis[di(4-heptoxyphenyl)sulfoniophenyl]sulfide bishexafluoroantimonate, 4,4'-bis[di(4-heptoxyphenyl)sulfoniophenyl]sulfide bishexafluorophosphate, 4-(4-benzoylphenylthio)phenyl-bis(4-fluorophenyl)sulfonium hexafluorophosphate, 4,4'-bis[bis((β-hydroxyethoxy)phenyl) sulfonio]phenylsulfide bishexafluorophosphate, 4,4'-bis[bis ((β-hydroxyethoxy)phenyl)sulfonio]phenylsulfide bishexafluoroantimonate, 4,4'-bis[bis(fluorophenyl)sulfonio]phenylsulfide bishexafluorophosphate, 4,4'-bis[bis(fluorophenyl)sulfonio]phenylsulfide bishexafluoroantimonate, 4,4'-bis(diphenylsulfonio)phenylsulfide bishexafluorophosphate, 4,4'-bis(diphenylsulfonio)phenylsulfide bishexafluoroantimonate, 4-(4-benzoylphenylthio)phenyl-bis(4-(β-hydroxyethoxy)phenyl)sulfonium hexafluorophosphate, 4-(4-benzoylphenylthio)phenyl-bis(4-(β-hydroxyethoxy)phenyl) sulfonium hexafluoroantimonate, 4-(4-benzoylphenylthio) phenyl-di-(4-fluorophenyl)sulfonium hexafluorophosphate, 4-(4-benzoylphenylthio)phenyl-bis(4-fluorophenyl)sulfonium hexafluoroantimonate, 4-(4-benzoylphenylthio)phenyl-diphenylsulfonium hexafluorophosphate, 4-(4-benzoylphenylthio)phenyl-diphenylsulfonium hexafluoroantimonate, 4-(phenylthio)phenyl-bis(4-(β-hydroxyethoxy)phenyl)sulfonium hexafluorophosphate, 4-(phenylthio)phenyl-di-(4-(β-hydroxyethoxy)phenyl)sulfonium hexafluoroantimonate, 4-(phenylthio)phenyl-di-(4-fluorophenyl)sulfonium hexafluorophosphate, 4-(phenylthio)phenyl-di-(4-fluorophenyl)sulfonium hexafluoroantimonate, 4-(phenylthio)phenyl-diphenylsulfonium hexafluorophosphate, 4-(phenylthio)phenyl-diphenyl-sulfonium hexafluoroantimonate, 4-(2-chloro-4-benzoylphenylthio)phenyl bis(4-fluorophenyl)sulfonium hexafluorophosphate, 4-(2-chloro-4-benzoylphenylthio)phenyl bis(4-fluorophenyl)sulfonium hexafluoroantimonate, 4-(2-chloro-4-benzoylphenylthio)phenyldiphenylsulfonium hexafluorophosphate, 4-(2-chloro-4-benzoylphenylthio)phenyldiphenylsulfonium hexafluoroantimonate, 4-(2-chloro-4-benzoylphenylthio)phenyl bis(4-hydroxyphenyl)sulfonium hexafluorophosphate, 4-(2-chloro-4-benzoylphenylthio)phenyl bis(4-hydroxyphenyl)sulfonium hexafluoroantimonate, triphenylsulfonium hexafluorophosphate, triphenylsulfonium hexafluoroantimonate, 4-acetoxyphenyldimethylsulfonium hexafluorophosphate, 4-acetoxyphenyldimethylsulfonium hexafluoroantimonate, 4-methoxycarbonyloxyphenyldimethylsulfonium hexafluorophosphate, 4-methoxycarbonyloxyphenyldimethylsulfonium hexafluoroantimonate, 4-ethoxycarbonyloxyphenyldimethylsulfonium hexafluorophosphate, 4-ethoxycarbonyloxyphenyldimethylsulfonium hexafluoroantimonate, and the like.

In addition, examples of the above-described amide-based curing agent include polyamide resins, diacetone acrylamide complexes, dicyandiamide, and the like. Examples of the above-described acid anhydride-based curing agent include phthalic anhydride, trimellitic anhydride, benzophenonetetracarboxylic anhydride, maleic anhydride, hexahydrophthalic anhydride, methylnadic anhydride, glutaric anhydride, pyromellitic anhydride, phenylene-bis(3-butane-1,2-dicarboxylic acid) anhydride, tetrabromophthalic anhydride, and the like.

The energy-curable resin composition of the present invention may be further blended with a weatherability-imparting agent as an arbitrary component. As the weatherability-imparting agent, use can be made of well-known materials which are generally used, such as a light stabilizer, an ultraviolet ray absorber, a phenol-based antioxidant, a sulfur-based antioxidant, and a phosphorus-based antioxidant. Examples of the light stabilizer include hindered amines; examples of the ultraviolet ray absorber include 2-hydroxybenzophenones, 2-(2-hydroxyphenyl)benzotriazoles, 2-(2-hydroxyphenyl)-4,6-diaryl-1,3,5-triazines, benzoates, and cyanoacrylates; examples of the phenol-based antioxidant include triethylene glycol-bis[3-(3-t-butyl-5-methyl-4-hydroxyphenyl)propionate], dibutyl hydroxytoluene (BHT), and 2,6-di-t-butyl-p-cresol (DBPC); examples of the sulfur-based antioxidant include dialkylthio dipropionates and β-alkylmercaptopropionic acid esters; and examples of the phosphorus-based antioxidant include organic phosphites.

In the case of using the above-described weatherability-imparting agent, its content is preferably from 0.0001 to 50% by mass, and more preferably from 0.001 to 10% by mass in the curable composition of the present invention from the standpoints of heat resistance, electric properties, curing properties, mechanical properties, storage stability, and handling properties.

The energy-curable resin composition in the present invention has good fluidity at room temperature (25° C.) and is excellent in handling properties. As for the fluidity, the viscosity measured at room temperature (25° C.) using an E-type viscometer in a state where a metal oxide fine powder is not contained is preferably not more than 50 Pa·s, and more preferably not more than 10 Pa·s.

In the energy-curable resin composition in the present invention, as for the type of curing, heat curing, light curing, or curing by both light and heat can be selected by choosing the above-described epoxy-curable compound. In the case of heat curing, a curing temperature is preferably from 60 to 200° C., and more preferably from 80 to 150° C. A curing time is preferably from 0.1 to 10 hours, and more preferably from 1 to 6 hours. In the case of light curing, examples of a usable active energy ray include an ultraviolet ray, an electron beam, an X-ray, a radial ray, and a high frequency, with an ultraviolet ray being the most preferable from the standpoint of economy. Examples of a light source of the ultraviolet ray include an ultraviolet ray laser, a mercury vapor lamp, a high-pressure mercury vapor lamp, a xenon lamp, a sodium vapor lamp, and an alkali metal vapor lamp. The ultraviolet ray source as used herein is preferably a high-pressure mercury vapor lamp. As for the irradiation energy, though its optimum condition varies depending upon the thickness of the applied film, it is generally in the range of from 100 to 10,000 mJ/cm$^2$. In addition, in the case of performing heat curing after light curing, heating may be performed generally at a temperature ranging from 60 to 150° C.

EXAMPLES

The present invention is hereunder further described by reference to Examples and the like, but it should not be construed that the present invention is limited to these Examples. Incidentally, all "parts" and "%" in Examples are on a mass basis unless otherwise indicated. As for the mass average molecular weight, a mass average molecular weight in terms of polystyrene in the case of performing GPC (Gel Permeation Chromatography) analysis using tetrahydrofuran as a solvent was defined as the mass average molecular weight. In addition, the epoxy equivalent was measured in accordance with JIS K-7236 (Determination of epoxy resins).

1-1. Synthesis of Silicon Compound

A plurality of silicon compounds having the structure represented by the general formula (1-1) and having a different amount of the introduced cyclic silicone site from each other were synthesized according to the following Synthesis Examples.

Synthesis Example 1-1

Ninety parts of dichlorodimethylsilane and 9 parts of dichlorodiphenylsilane were mixed and then added dropwise to a mixture composed of 100 parts of ion-exchanged water, 50 parts of toluene and 450 parts of a 48% sodium hydroxide aqueous solution, followed by performing polymerization at 105° C. for 5 hours. The resulting reaction solution was washed with 500 parts of ion-exchanged water. Thereafter, this toluene solution was dehydrated, to which was then added 20 parts of pyridine, and 10 parts of dimethylvinylchlorosilane was further added thereto, followed by stirring at 70° C. for 30 minutes. Thereafter, the resultant was washed with 100 parts of ion-exchanged water, and thereafter, the solvent was distilled off under reduced pressure at 150° C. Subsequently, the residue was washed with 100 parts of acetonitrile, and thereafter, the solvent was distilled off under reduced pressure at 70° C., thereby obtaining a noncyclic polysiloxane compound (1-a1-1) having an unsaturated bond. As a result of analysis by GPC under the following condition, the noncyclic polysiloxane compound (1-a1-1) had a mass average molecular weight of Mw=3,840. Incidentally, the subsequent GPC was all performed under this condition.

(Measuring Condition of GPC)
Column: TSK-GEL MULTIPORE HXL M, 7.8 mm×300 mm, manufactured by Tosoh Corporation
Developing solvent: Tetrahydrofuran

Synthesis Example 1-2

A hundred parts of the noncyclic polysiloxane (1-a1-1) obtained in Synthesis Example 1-1 was dissolved in 200 parts of toluene, to which were then added 0.003 parts of a platinum catalyst and 10 parts of 1,3,5,7-tetramethylcyclotetrasiloxane that is a cyclic polysiloxane compound, followed by reaction at 105° C. for 2 hours. The solvent was distilled off under reduced pressure at 70° C., and the residue was then washed with 100 parts of acetonitrile. Thereafter, the solvent was distilled off under a reduced pressure at 70° C., thereby obtaining a polysiloxane intermediate (1-a3-1). As a result of analysis by GPC, the polysiloxane intermediate (1-a3-1) had a mass average molecular weight of Mw=4,300.

Synthesis Example 1-3

Manufacture of Silicon Compound (1-A-1)

A hundred parts of the polysiloxane intermediate (1-a3-1) obtained in Synthesis Example 1-2 was dissolved in 200 parts of toluene, to which was then added 19 parts of 3-vinyl-7-oxabicyclo[4,1,0]heptane that is an epoxy compound, followed by stirring at 105° C. for 2 hours. The solvent was distilled off under reduced pressure at 70° C., and the residue was then washed with 100 parts of acetonitrile. Thereafter, the solvent was distilled off under a reduced pressure at 70° C., thereby obtaining a silicon compound (1-A-1). As a result of analysis by GPC, the silicon compound (1-A-1) had a mass average molecular weight of Mw=4,800 and the content of the cyclic silicone site of 20% by mass.

Synthesis Example 1-4

Furthermore, in the above-described Synthesis Examples 1-1 to 1-3, the conditions of hydrolysis and polymerization were changed to adjust the molecular weight of the linear silicone site, thereby preparing seven kinds of silicon compounds having the same structure as that in the silicon compound (1-A-1) and having a different content of the cyclic silicone site from each other (the amount of the introduced cyclic silicone site was 5% by mass, 10% by mass, 15% by mass, 20% by mass, 25% by mass, 30% by mass, and 35% by mass, respectively).

1-2. Preparation of Ultraviolet Ray-Curable Composition

Ninety-nine parts by mass of each of the silicon compounds obtained in the above-described Synthesis Examples were mixed with 1 part by mass of 4-isopropyl-4'-methyldiphenyliodonium tetrakis(pentafluorophenyl)borate, to obtain a curable composition.

1-3. Preparation of Optical Fiber Core Wire

A pure silica core optical fiber composed mainly of silica and having a core diameter of 9.1 μm, a cladding diameter of 125 μm, and a relative refractive index difference of 0.42% was used as a glass fiber. Then, the outer periphery of the glass fiber was coated with an inner coating layer made by curing the ultraviolet ray-curable resin composition upon irradiation with an ultraviolet ray, and subsequently, the outer periphery of the inner coating layer was coated with an outer coating layer made by curing the ultraviolet ray-curable resin composition upon irradiation with an ultraviolet ray, thereby obtaining optical fibers of the following Examples 1-1 to 1-5 and Comparative Examples 1-1 to 1-3. All of them were set to have an outer diameter of the inner coating layer being 200 μm and an outer diameter of the outer coating layer being 245 μm. Incidentally, Example 1-1 and Comparative Examples 1-1 and 1-2 were configured to have a single layer, and prepared by forming the outer coating layer on the outer periphery of the glass fiber without forming an inner coating layer so as to have an outer diameter of 200 μm.

1-4. Evaluation of Optical Fiber Core Wire

The optical fiber core wire was evaluated in the following manners. Results are shown in Table 1-1.
(Crack Test Method)
A 10 m of the optical fiber was formed in a bundle state of about ϕ160, placed into a thermostat bath kept at 200° C., and observed for deterioration. The case where the optical fiber coating was free from the generation of crack or peeling over 90 days or more was denoted as "A", and the case of not satisfying it was denoted as "B".

transmittance of the test piece before attachment of the silica gel to light of 800 nm was all 99% or more.
Evaluation Criteria of Tackiness:
  AA: The transmittance is 90% or more.
  A: The transmittance is from 70 to 89% or more.
  B: The transmittance is not more than 69%.
(Decision of Heat Resistance)
As for the heat resistance, the case where all of the above-described crack test, tensile test, and transmission loss evaluation were graded as "A" or more was decided to be good enough.
[Table 1]

TABLE 1-1

|  |  |  | Ex. 1-1 | Ex. 1-2 | Ex. 1-3 | Ex. 1-4 | Ex. 1-5 | Comp. Ex. 1-1 | Comp. Ex. 1-2 | Comp. Ex. 1-3 |
|---|---|---|---|---|---|---|---|---|---|---|
| Coating layer configuration | Inner coating layer | Kind of silicon compound | — | 1-A-1 | 1-A-1 | 1-A-1 | 1-A-1 | — | — | 1-A-1 |
|  |  | Content of cyclic silicone site |  | 15% by mass | 10% by mass | 20% by mass | 25% by mass |  |  | 10% by mass |
|  | Outer coating layer | Kind of silicon compound | 1-A-1 | 1-A-1 | 1-A-1 | 1-A-1 | 1-A-1 | 1-A-1 | 1-A-1 | 1-A-1 |
|  |  | Content of cyclic silicone site | 20% by mass | 20% by mass | 20% by mass | 30% by mass | 30% by mass | 5% by mass | 35% by mass | 35% by mass |
| Evaluation |  | Crack test | A | A | A | A | A | A | B | B |
|  |  | Tensile strength | A | A | A | A | A | A | B | B |
|  |  | Transmission loss | A | AA | AA | AA | A | B | B | A |
|  |  | Tackiness (transmittance) | A | A | A | A | A | B | AA | AA |

(Tensile Test Method)
A tensile strength of the optical fiber was tested at a gauge line of 500 mm and a tensile speed of 25 mm/min with N=15. The optical fiber was allowed to stand at 200° C. for 90 days, and the tensile strength of the optical fiber before and after standing was measured to determine a retention rate. The case where a median of the tensile strength kept the retention rate of 90% was denoted as "A", and the case of not satisfying it was denoted as "B".
(Transmission Loss Evaluation Method)
A 1 km of an optical fiber bundle of 280ϕ was prepared and placed into a thermostat bath, and a loss change from an initial state (immediately after start of deterioration at 200° C.) to a lapse of time (90 days) was evaluated by OTDR. The measurement of loss was carried out an OTDR measuring instrument at a wavelength of 1.55 μm.
Evaluation Criteria of Transmission Loss:
  AA: The transmission loss change is kept less than 0.05 dB/km.
  A: The transmission loss change is from 0.05 to 0.10 dB/km.
  B: The transmission loss change is more than 0.10 dB/km.
(Tackiness Evaluation Method)
As for the cured state, curing condition: a high-pressure mercury vapor lamp (10 mW/cm$^2$, @365 nm) was used, irradiation was carried out for 100 seconds, and post-bake was performed at 120° C. for 10 minutes. The test piece was put into a vessel filled with a powdered silica gel (manufactured by Wako Pure Chemical Industries, Ltd., a trade name: WAKO GEL C-100,) such that the whole was embedded. This test piece was dropped three times on a glass plate from a height of 10 cm such that the cured surface became perpendicular. Thereafter, a transmittance to light of 800 nm was measured. It is meant that the lower the transmittance, the more likely the surface reveals tackiness. Incidentally, the 2-1. Silicon Compound Silicon compounds 2-A-1, 2-A-2, 2-B-1, 2-A'-1, and 2-A'-2 were synthesized in the following methods. Incidentally, the silicon compounds 2-A-1 and 2-A-2 are compounds corresponding to the compound (A) of the present invention, and the silicon compound B-1 is a compound corresponding to the compound (B) of the present invention.

Manufacturing Example 2-1

Linear Polysiloxane Compound 2-a-1

In a glass-made reactor equipped with a thermometer and a stirring device were charged 130 g of ion-exchanged water, 550 g of a 48% sodium hydroxide aqueous solution and 100 g of toluene as a solvent, and thereto was added dropwise a mixture of 110 g (0.85 mol) of dimethyldichlorosilane and 37.8 g (0.15 mol) of diphenyldichlorosilane at not higher than 30° C. over one hour while stirring. After completion of the dropwise addition, stirring was further continued at 105° C. for 5 hours. The resulting reaction solution was washed with 500 g of ion-exchanged water, purified salt was removed, and the solvent was then distilled off under reduced pressure at 60° C. To this reaction product was added 12.1 g (0.1 mol) of dimethylvinylchlorosilane to which 63 g (0.8 mol) of pyridine had been added for dissolution, followed by stirring at 70° C. for 30 minutes. Thereafter, washing with 100 g of ion-exchanged water was performed, and the solvent was then distilled off under reduced pressure at 100° C., thereby obtaining a linear siloxane compound 2-a-1 having a vinyl group at the both ends thereof. A mass average molecular weight of the linear siloxane compound 2-a-1 by GPC was 17,000. The linear siloxane compound 2-a-1 is corresponding to a compound represented by the general formula (2-1a), in which $R^1$ is a phenyl group, m is 154, and n is 27, with a molar ratio between the contents of the methyl group and the phenyl group in the repeating portions of the molecule being 85:15. Incidentally, m and n were determined by calculation from the charging ratio of the raw materials and the mass average molecular weight.

Manufacturing Example 2-2

Linear Polysiloxane Compound 2-a-2

The same operations as those in Manufacturing Example 2-1 were performed, except that in Manufacturing Example 2-1, a mixture of 96.8 g (0.75 mol) of dimethyldichlorosilane and 63.1 g (0.25 mol) of diphenyldichlorosilane was used in place of the mixture of 110 g (0.85 mol) of dimethyldichlorosilane and 37.8 g (0.15 mol) of diphenyldichlorosilane, thereby obtaining a linear siloxane compound 2-a-2 having a vinyl group at the both ends thereof. A mass average molecular weight of the linear siloxane compound 2-a-2 by GPC was 13,500. The linear siloxane compound 2-a-2 is corresponding to a compound represented by the general formula (2-1a), in which $R^1$ is a phenyl group, m is 95, and n is 32, with a molar ratio between the contents of the methyl group and the phenyl group in the repeating portions of the molecule being 75:25. Incidentally, m and n were determined by calculation from the charging ratio of the raw materials and the mass average molecular weight.

Manufacturing Example 2-3

Silicon Compound 2-A-1

In a glass-made reactor equipped with a thermometer and a stirring device were added 17 g (1 mmol) of the linear siloxane compound 2-a-1, 1.44 g (6 mmol) of 2,4,6,8-tetramethylcyclotetrasiloxane, 10 mg of a platinum-divinyltetramethyldisiloxane complex (Karstedt catalyst), and 50 g of toluene as a solvent, followed by reaction at 105° C. for 2 hours while stirring. The unreacted 2,4,6,8-tetramethylcyclotetrasiloxane and the solvent were distilled off under reduced pressure at 80° C. Thereafter, thereto were charged 0.99 g (8 mmol) of 1,2-epoxy-4-vinylcyclohexane and 50 g of toluene as a solvent, followed by reacting at 105° C. for 3 hours while stirring. After completion of the reaction, the unreacted 1,2-epoxy-4-vinylcyclohexane and the solvent were distilled off under reduced pressure at 80° C., thereby obtaining a silicon compound 2-A-1 of the present invention. The silicon compound 2-A-1 is corresponding to a compound represented by the general formula (2-1), in which $R^1$ is a phenyl group, $R^2$ is a methyl group, a is 3, m is 154, and n is 27, with a molar ratio between the contents of the methyl group and the phenyl group in the repeating portions of the molecule being 85:15. In addition, an epoxy equivalent of the compound 2-A-1 was 3,090.

Manufacturing Example 2-4

Silicon Compound 2-A-2

The same operations as those in Manufacturing Example 1 were performed, except that in Manufacturing Example 2-3, 13.5 g (1 mmol) of the linear siloxane compound 2-a-2 was used instead of using 17 g (1 mmol) of the linear siloxane compound 2-a-1, thereby obtaining a silicon compound 2-A-2 of the present invention. The silicon compound 2-A-2 is corresponding to a compound represented by the general formula (2-1), in which $R^1$ is a phenyl group, $R^2$ is a methyl group, a is 3, m is 95, and n is 32, with a molar ratio between the contents of the methyl group and the phenyl group in the repeating portions of the molecule being 75:25. In addition, an epoxy equivalent of the compound 2-A-2 was 2,510.

Manufacturing Method 2-5: Silicon Compound 2-B-1

In a glass-made reactor equipped with a thermometer and a stirring device were charged 48 g (0.2 mol) of 2,4,6,8-tetramethylcyclotetrasiloxane, 124 g (1 mol) of 1,2-epoxy-4-vinylcyclohexane, 10 mg of a platinum-divinyltetramethyldisiloxane complex (Karstedt catalyst), and 200 g of toluene as a solvent, followed by reaction at 105° C. for 3 hours while stirring. Thereafter, the unreacted 1,2-epoxy-4-vinylcyclohexane and the solvent were distilled off under reduced pressure at 100° C., thereby obtaining a silicon compound 2-B-1 of the present invention. The low-silicon compound 2-B-1 is corresponding to a compound represented by the general formula (2-2), in which $R^3$ is a methyl group, and b is the number of 4, and an epoxy equivalent thereof was 184.

Comparative Manufacturing Example 2-1

Linear Siloxane Compound 2-a'-1

The same operations as those in Manufacturing Example 2-1 were performed, except that in Manufacturing Example 2-1, 129 g (1 mol) of dimethyldichlorosilane was used in place of the mixture of 110 g (0.85 mol) of dimethyldichlorosilane and 37.8 g (0.15 mol) of diphenyldichlorosilane, thereby obtaining a linear siloxane compound 2-a'-1 having a vinyl group at the both ends thereof. A mass average molecular weight of the linear siloxane compound 2-a'-1 by GPC was 40,000. The linear siloxane compound 2-a'-1 is corresponding to a compound represented by the general formula (2-1a), in which in is 538, and n is 0, with a molar ratio between the contents of the methyl group and the phenyl group in the repeating portions of the molecule being 100:0. Incidentally, in was determined by calculation from the mass average molecular weight.

Comparative Manufacturing Example 2-2

Linear Siloxane Compound 2-a'-2

The same operations as those in Manufacturing Example 1 were performed, except that in Manufacturing Example 2-1, 9.5 g (0.1 mol) of dimethylchlorosilane was used in place of 12.1 g (0.1 mol) of dimethylvinylchlorosilane, thereby obtaining a linear siloxane compound 2-a'-2. A mass average molecular weight of the linear siloxane compound 2-a'-2 by GPC was 17,000. The linear siloxane compound 2-a'-2 is a compound represented by the following formula (3). Incidentally, the numbers of repeating units of the following formula were determined by calculation from the charging ratio of the raw materials and the mass average molecular weight.

[Chem. 17]

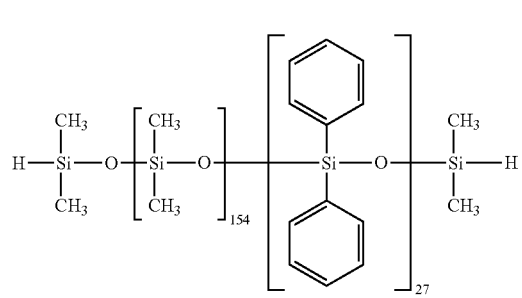
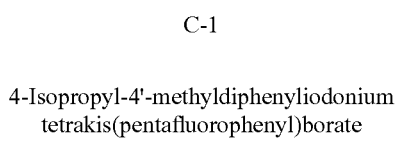

Comparative Manufacturing Example 2-3

Comparative Silicon Compound 2-A'-1

The same operations as those in Manufacturing Example 3 were performed, except that in Manufacturing Example 2-3, 40 g (1 mmol) of the linear siloxane compound linear siloxane compound 2-a'-1 was used in place of 17 g (1 mmol) of the linear siloxane compound 2-a-1, thereby obtaining a comparative silicon compound 2-A'-1. The silicon compound 2-A'-1 is corresponding to a compound represented by the general formula (2-1), in which $R^2$ is a methyl group, a is 3, m is 538, and n is 0, with a molar ratio between the contents of the methyl group and the phenyl group in the repeating portions of the molecule being 100:0.

Comparative Manufacturing Example 2-4

Comparative Silicon Compound 2-A'-2

In a glass-made reactor equipped with a thermometer and a stirring device were charged 17 g (1 mmol) of the linear siloxane compound 2-a'-2, 0.37 g (3 mmol) of 1,2-epoxy-4-vinylcyclohexane, 10 mg of a platinum-divinyltetramethyldisiloxane complex (Karstedt catalyst), and 50 g of toluene as a solvent, followed by reaction at 105° C. for 2 hours while stirring. The unreacted 1,2-epoxy-4-vinylcyclohexane and the solvent were distilled off under reduced pressure at 80° C., thereby obtaining a comparative silicon compound 2-A'-2. The silicon compound 2-A'-2 is a compound represented by the following formula (4), and had an epoxy equivalent thereof was 8,650.

2-2. Epoxy-Curable Compound

In the present Examples and Comparative Examples, a compound expressed by the following C-1 was used as an epoxy-curable compound.

C-1

4-Isopropyl-4'-methyldiphenyliodonium tetrakis(pentafluorophenyl)borate 2-3. Preparation of Ultraviolet Ray-Curable Composition Using the above-described silicon compounds 2-A-1, 2-A-2, 2-B-1, 2-A'-1, and 2-A'-2 and epoxy-curable compound C-1, 99 parts by mass of the silicon compound and 1 part by mass of the epoxy-curable compound were mixed to prepare ultraviolet ray-curable compositions shown in Table 2-1. Incidentally, in Table 2-1, the kind of the silicon compound and the mixing proportion (on a mass basis) in the parenthesis are shown.

2-4. Preparation of Optical Fiber Core Wire

A pure silica core optical fiber composed mainly of silica and having a core diameter of 9.1 μm, a cladding diameter of 125 μm, and a relative refractive index difference of 0.42% was used as a glass fiber. Then, the outer periphery of the glass fiber was coated with an inner coating layer made by curing the ultraviolet ray-curable resin composition upon irradiation with an ultraviolet ray, and subsequently, the outer periphery of the inner coating layer was coated with an outer coating layer made by curing the ultraviolet ray-curable resin composition upon irradiation with an ultraviolet ray, thereby obtaining optical fibers of Examples 2-1 to 2-8 and Comparative Examples 2-1 to 2-7 shown in Table 2-1. All of them were set to have an outer diameter of the inner coating layer being 200 μm and an outer diameter of the outer coating layer being 245 μm. Incidentally, Examples 2-1 to 2-4 and Comparative Examples 2-1 to 2-3 and 2-6 to 2-7 were configured to have a single layer, and prepared by forming the outer coating layer on the outer periphery of the glass fiber without forming an inner coating layer so as to have an outer diameter of 200 μm. Table 2-1, the numerals shown in the parentheses in the column of "Coating layer configuration" express a part by weight.

[Chem. 18]

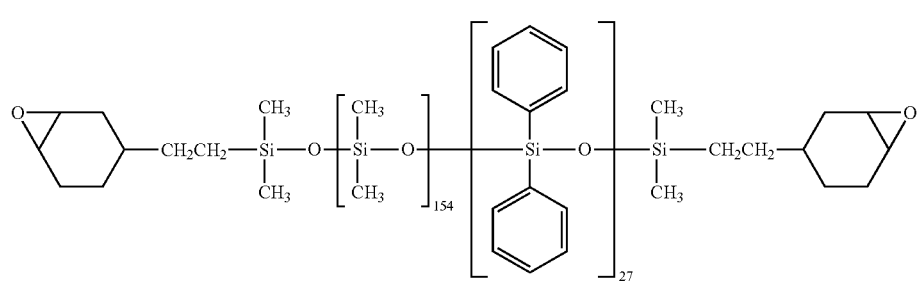

2-5. Evaluation of Optical Fiber Core Wire

The optical fiber core wire was evaluated in the following manners. Results are shown in Table 2-1.

(Crack Test Method)

A 10 m of the optical fiber was formed in a bundle state of about ϕ160, placed into a thermostat bath kept at 200° C., and observed for deterioration. The case where the optical fiber coating was free from the generation of crack or peeling over 90 days or more was denoted as "A", and the case of not satisfying it was denoted as "B".

TABLE 2-1

|  |  |  | Example | | | | | | | | Comparative Example | | | | | | |
|---|---|---|---|---|---|---|---|---|---|---|---|---|---|---|---|---|---|
|  |  |  | 2-1 | 2-2 | 2-3 | 2-4 | 2-5 | 2-6 | 2-7 | 2-8 | 2-1 | 2-2 | 2-3 | 2-4 | 2-5 | 2-6 | 2-7 |
| Coating layer configuration | Outside | (A) | 2-A-1 (88) | 2-A-1 (80) | 2-A-1 (72) | 2-A-2 (80) | 2-A-1 (80) | 2-A-2 (80) | 2-A-1 (75) | 2-A-2 (75) | 2-A-1 (95) | 2-A-1 (65) | 2-A-2 (65) | 2-A-1 (65) | 2-A-2 (65) | 2-A'-1 (80) | 2-A'-2 (80) |
|  |  | (B) | 2-B-1 (12) | 2-B-1 (20) | 2-B-1 (28) | 2-B-1 (20) | 2-B-1 (20) | 2-B-1 (20) | 2-B-1 (25) | 2-B-1 (25) | 2-B-1 (5) | 2-B-1 (35) | 2-B-1 (35) | 2-B-1 (35) | 2-B-1 (35) | 2-B-1 (20) | 2-B-1 (20) |
|  | Inside | (A) | — | — | — | — | 2-A-1 (85) | 2-A-2 (85) | 2-A-1 (85) | 2-A-2 (85) | — | — | — | 2-A-1 (85) | 2-A-2 (85) | — | — |
|  |  | (B) | — | — | — | — | 2-B-1 (15) | 2-B-1 (15) | 2-B-1 (15) | 2-B-1 (15) | — | — | — | 2-B-1 (15) | 2-B-1 (15) | — | — |
| Evaluation | Crack test | | A | A | A | A | A | A | A | A | A | B | B | B | B | B | A |
|  | Tensile test | | A | A | A | A | A | A | A | A | B | B | B | B | B | B | B |
|  | Transmission loss | | A | A | A | A | AA | AA | AA | AA | A | B | B | A | A | B | B |
|  | Tackiness | | A | A | A | A | A | A | A | A | B | AA | AA | AA | AA | B | B |

(Tensile Test Method)

A tensile strength of the optical fiber was tested at a gauge line of 500 mm and a tensile speed of 25 mm/min with N=15. The optical fiber was allowed to stand at 200° C. for 90 days, and the tensile strength of the optical fiber before and after standing was measured to determine a retention rate. The case where a median of the tensile strength kept the retention rate of 90% was denoted as "A", and the case of not satisfying it was denoted as "B".

(Transmission Loss Evaluation Method)

A 1 km of an optical fiber bundle of 280ϕ was prepared and placed into a thermostat bath, and a loss change from an initial state (immediately after start of deterioration at 200° C.) to a certain of time (90 days) was evaluated by OTDR. The measurement of loss was carried out an OTDR measuring instrument at a wavelength of 1.55 μm.

Evaluation criteria of transmission loss:

AA: The transmission loss change is kept less than 0.05 dB/km.

A: The transmission loss change is from 0.05 to 0.10 dB/km.

B: The transmission loss change is more than 0.10 dB/km.

(Tackiness Evaluation Method)

As for the cured state, curing condition: a high-pressure mercury vapor lamp (10 mW/cm², @365 nm) was used, irradiation was carried out for 100 seconds, and post-bake was performed at 120° C. for 10 minutes. The test piece was put in a vessel filled with a powdered silica gel (manufactured by Wako Pure Chemical Industries, Ltd., a trade name: WAKO GEL C-100) such that the whole was embedded. This test piece was dropped three times on a glass plate from a height of 10 cm such that the cured surface became perpendicular. Thereafter, a transmittance to light of 800 nm was measured. It is meant that the lower the transmittance, the more likely the surface reveals tackiness. Incidentally, the transmittance of the test piece before attachment of the silica gel to light of 800 nm was all 99% or more.

Evaluation criteria of tackiness:

AA: The transmittance is 90% or more.

A: The transmittance is from 70 to 89% or more.

B: The transmittance is not more than 69%.

(Decision of Heat Resistance)

As for the heat resistance, the case where all of the above-described crack test, tensile test, and transmission loss evaluation were graded as "A" or more was decided to be good enough.

While the invention has been described in detail and with reference to specific embodiments thereof, it will be apparent to one skilled in the art that various changes and modifications can be made therein without departing from the spirit and scope thereof.

Incidentally, the present application is based on a Japanese patent application filed on May 10, 2011 (Japanese Patent Application No. 2011-105251) and a Japanese patent application filed on Sep. 7, 2011 (Japanese Patent Application No. 2011-194856), the entirety of which is incorporated by reference. In addition, all references cited herein are incorporated as a whole.

DESCRIPTION OF REFERENCE NUMERALS AND SIGNS

1, 6: Optical fiber, 2: Core part, 3: Cladding part, 4: Glass fiber, 5, 8: Coating layer, 5': Outer coating layer, 7: Inner coating layer.

The invention claimed is:

1. An optical fiber having, on an outer periphery of a glass fiber composed of a core part and a cladding part, a coating layer made by crosslinking an energy-curable resin composition containing a silicon compound, wherein
the silicon compound contained in the energy-curable resin composition of the coating layer as an outermost layer is a silicon compound represented by the following general formula (1), with the content of a cyclic silicone site in the following formula (1) being from 10 to 30% by mass:

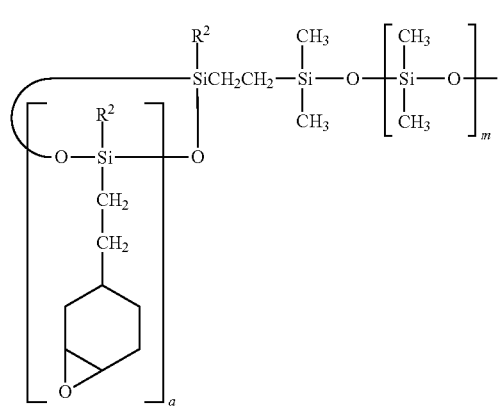

(1)

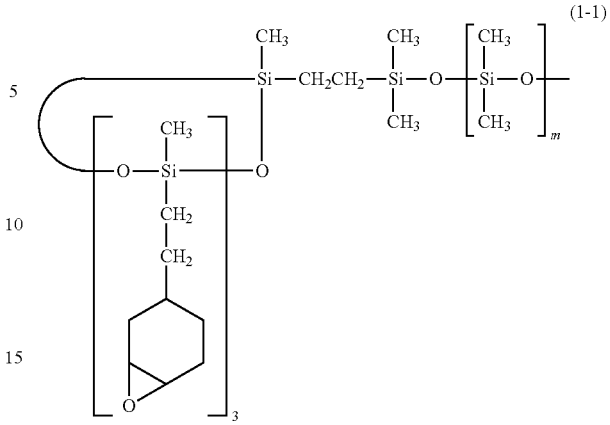

(1-1)

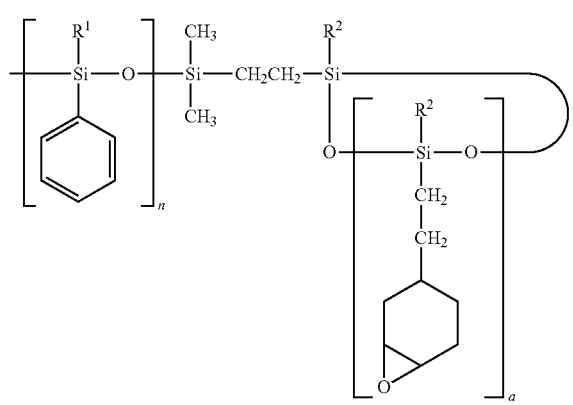

wherein, each of $R^1$ and $R^2$ independently represents a methyl group or a phenyl group; m represents the number of from 1 to 350; n represents the number of from 1 to 150; and a represents the number of from 2 to 5, provided that a molar ratio between the contents of methyl group and phenyl group in a polymerization site in which m is the repeating number and a polymerization site in which n is the repeating number is from 70:30 to 90:10, and the polymerization site in which m is the repeating number and the polymerization site in which n is the repeating number may be arranged in either a block form or a random form, which is an optical fiber having, on an outer periphery of a glass fiber composed of a core part and a cladding part, a coating layer made by crosslinking an energy-curable resin composition containing a silicon compound, wherein the silicon compound contained in the energy-curable resin composition of the coating layer as an outermost layer is a silicon compound represented by the following general formula (1-1), with the content of a cyclic silicone site being from 10 to 30% by mass:

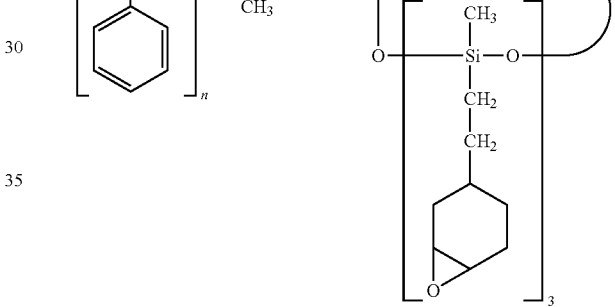

wherein, $R^1$ represents a methyl group or a phenyl group; m represents the number of from 1 to 350; and n represents the number of from 1 to 150, provided that a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form, wherein the coating layer is configured of two layers of an inner coating layer and an outer coating layer;

the energy-curable resin composition of the outer coating layer contains the silicon compound represented by the general formula (1-1), with the content (% by mass) of the cyclic silicone site being from 10 to 30% by mass;

the energy-curable resin composition of the inner coating layer contains the silicon compound represented by the general formula (1-1), with the content (% by mass) of the cyclic silicone site being from 5 to 20% by mass; and the content of the cyclic silicone site of the silicon compound contained in the inner coating layer is smaller than the content of the cyclic silicone site of the silicon compound contained in the outer coating layer.

2. The optical fiber according to claim 1, wherein the content of the cyclic silicone site of the silicon compound contained in the energy-curable resin composition of the inner coating layer is smaller by at least 5% by mass than the content of the cyclic silicone site of the silicon compound contained in the energy-curable resin composition of the outer coating layer.

3. An optical fiber having, on an outer periphery of a glass fiber composed of a core part and a cladding part, a coating layer made by crosslinking an energy-curable resin composition containing a silicon compound, wherein the silicon compound contained in the energy-curable resin composition of the coating layer as an outermost layer is a silicon compound represented by the following general formula (1), with the content of a cyclic silicone site in the following formula (1) being from 10 to 30% by mass:

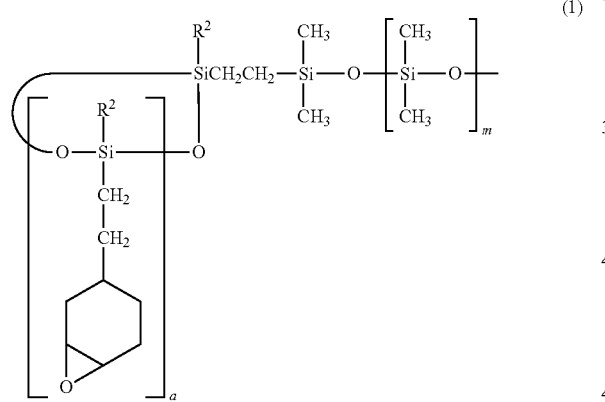

(1)

-continued

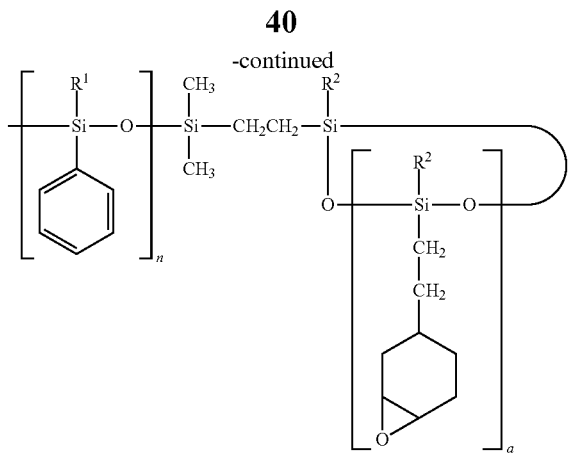

wherein, each of $R^1$ and $R^2$ independently represents a methyl group or a phenyl group; m represents the number of from 1 to 350; n represents the number of from 1 to 150; and a represents the number of from 2 to 5, provided that a molar ratio between the contents of methyl group and phenyl group in a polymerization site in which m is the repeating number and a polymerization site in which n is the repeating number is from 70:30 to 90:10, and the polymerization site in which m is the repeating number and the polymerization site in which n is the repeating number may be arranged in either a block form or a random form, which is an optical fiber having, on an outer periphery of a glass fiber composed of a core part and a cladding part, a coating layer made by crosslinking an energy-curable resin composition containing a silicon compound, wherein the silicon compound contained in the energy-curable resin composition of the coating layer contains a compound (A) represented by the following general formula (2-1) and a compound (B) represented by the following general formula (2-2), with the content of the compound (B) being from 10 to 30 parts by mass based on 100 parts by mass of a total sum of the compound (A) and the compound (B):

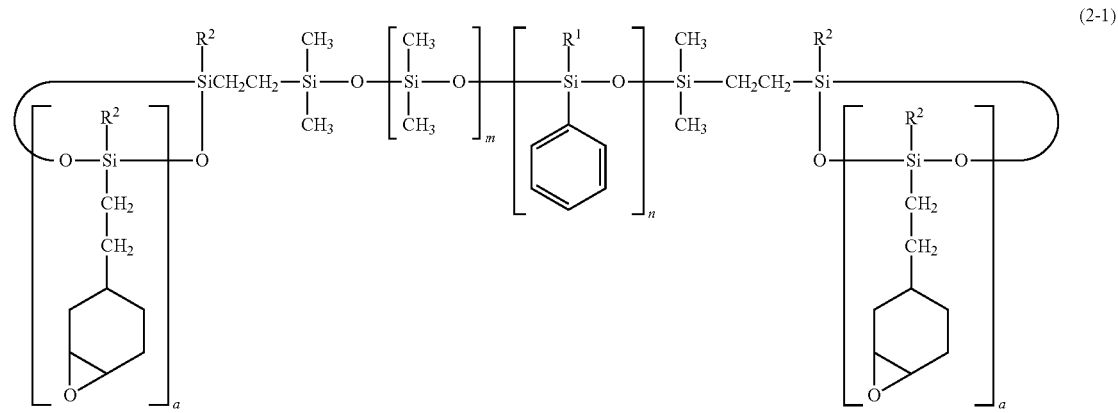

(2-1)

wherein, each of $R^1$ and $R^2$ independently represents a methyl group or a phenyl group; m represents the number of at least 10; n represents the number of at least 10; and a represents the number of from 2 to 5, provided that (m+n) is the number of from 20 to 10,000, a molar ratio between the contents of the methyl group and the phenyl group in the polymerization site in which m is the repeating number and the polymerization site in which n is the repeating number is from 70:30 to 90:10, and the polymerization site in which m is the repeating number and the polymerization site in which n is the repeating number may be arranged in either a block form or a random form; and

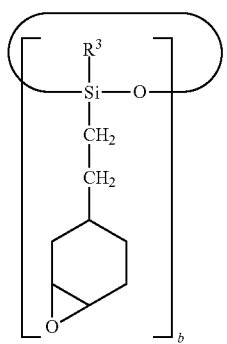

(2-2)

wherein, $R^3$ represents a methyl group or a phenyl group; and b represents the number of from 3 to 6.

4. The optical fiber according to claim 3, wherein the coating layer is configured of two layers of an inner coating layer and an outer coating layer; and the content of the compound (B) included in 100 parts by mass of a total sum of the compound (A) and the compound (B), contained in the energy-curable resin composition of the outer coating layer, is larger than the content of the compound (B) included in 100 parts by mass of a total sum of the compound (A) and the compound (B), contained in the energy-curable resin composition of the inner coating layer.

5. The optical fiber according to claim 4, wherein the coating layer is configured of two layers of an inner coating layer and an outer coating layer; and the content of the compound (B) included in 100 parts by mass of a total sum of the compound (A) and the compound (B), contained in the energy-curable resin composition of the outer coating layer, is larger by at least 5 parts by mass than the content of the compound (B) included in 100 parts by mass of a total sum of the compound (A) and the compound (B), contained in the energy-curable resin composition of the inner coating layer.

* * * * *